US010302442B2

(12) United States Patent
Hajj et al.

(10) Patent No.: US 10,302,442 B2
(45) Date of Patent: May 28, 2019

(54) TRANSIT INCIDENT REPORTING

(71) Applicant: Apple Inc., Cupertino, CA (US)

(72) Inventors: Usama M. Hajj, San Francisco, CA (US); Julien Grimault, San Francisco, CA (US); Ellis M. Verosub, San Carlos, CA (US); Tara A. Teich, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 214 days.

(21) Appl. No.: 15/275,318

(22) Filed: Sep. 23, 2016

(65) Prior Publication Data
US 2017/0010118 A1 Jan. 12, 2017

Related U.S. Application Data

(63) Continuation-in-part of application No. 14/869,694, filed on Sep. 29, 2015, now Pat. No. 9,891,065.
(Continued)

(51) Int. Cl.
G01C 21/00 (2006.01)
G01C 21/34 (2006.01)
(Continued)

(52) U.S. Cl.
CPC ..... *G01C 21/3492* (2013.01); *G01C 21/3423* (2013.01); *G01C 21/3694* (2013.01); *G08G 1/123* (2013.01); *H04M 1/72522* (2013.01)

(58) Field of Classification Search
None
See application file for complete search history.

(56) References Cited

U.S. PATENT DOCUMENTS 5,177,684 A 1/1993 Harker et al.
5,412,573 A 5/1995 Barnea et al.
(Continued)

FOREIGN PATENT DOCUMENTS

| EP | 2733651 A1 | 5/2014 |
| TW | 201038923 A | 11/2010 |
| WO | 2015/024807 A1 | 2/2015 |

OTHER PUBLICATIONS

Tirachini A. et al.: "Restating modal investment priority with an improved model for public transport analysis", Transportation Research Part E: Logistics and Transportation Review, Pergamon, Amsterdam, NL, vol. 46, No. 6, Nov. 1, 2010 (Nov. 1, 2010), pp. 1148-1168, XP027121542, ISSN: 1365-5545.
(Continued)

*Primary Examiner* — Jonathan M Dager
(74) *Attorney, Agent, or Firm* — Invoke

(57) ABSTRACT

Some embodiments of the invention provide a method for displaying on a device incident reports regarding transit lines and stations. Through a map application of the device, the method of some embodiments receives an incident report regarding transit lines or stations of interest. The method displays the incident report in an incident reporting display area that is accessible on the device without opening of the map application. The incident report in some embodiments includes a set of incidents associated with the transit line or station. In some embodiments, an incident can be an incident about the overall transit line, a portion of the transit line, or stations along the transit line. A station is a location along a transit line at which a transit vehicle that travels the transit line stops. In some embodiments, the transit vehicle passengers get on or off the transit vehicle at a transit station.

20 Claims, 18 Drawing Sheets

Related U.S. Application Data

(60) Provisional application No. 62/348,815, filed on Jun. 10, 2016, provisional application No. 62/172,206, filed on Jun. 7, 2015, provisional application No. 62/172,209, filed on Jun. 7, 2015, provisional application No. 62/172,214, filed on Jun. 7, 2015, provisional application No. 62/172,216, filed on Jun. 7, 2015, provisional application No. 62/172,147, filed on Jun. 7, 2015.

(51) Int. Cl.
*G01C 21/36* (2006.01)
*G08G 1/123* (2006.01)
*H04M 1/725* (2006.01)

(56) References Cited

U.S. PATENT DOCUMENTS

| | | | |
|---|---|---|---|
| 5,977,990 A | 11/1999 | Kowalski | |
| 6,249,741 B1 | 6/2001 | Iwasaki et al. | |
| 7,030,781 B2 * | 4/2006 | Jones | G08G 1/123 340/989 |
| 7,221,287 B2 * | 5/2007 | Gueziec | H04W 4/029 340/905 |
| 7,469,827 B2 | 12/2008 | Katragadda et al. | |
| 7,693,657 B2 | 4/2010 | Endo et al. | |
| 7,746,343 B1 | 6/2010 | Charaniya et al. | |
| 7,818,116 B1 * | 10/2010 | Nesbitt | G01C 21/367 340/955 |
| 7,925,427 B2 | 4/2011 | Zehler | |
| 7,933,897 B2 | 4/2011 | Jones et al. | |
| 7,957,871 B1 * | 6/2011 | Echeruo | G01C 21/3626 104/27 |
| 8,031,206 B2 * | 10/2011 | Shoemaker | G06T 3/40 345/619 |
| 8,301,112 B2 * | 10/2012 | Morrison | G08G 1/096725 455/404.2 |
| 8,315,801 B2 | 11/2012 | Takagi | |
| 8,489,328 B2 * | 7/2013 | Lee | G09B 29/10 701/410 |
| 8,532,851 B2 | 9/2013 | Kondo et al. | |
| 8,588,818 B2 | 11/2013 | Huang et al. | |
| 8,681,176 B1 | 3/2014 | Maurer et al. | |
| 8,825,376 B1 * | 9/2014 | Szybalski | G01C 21/3415 701/412 |
| 8,972,185 B1 | 3/2015 | Viger et al. | |
| 8,972,190 B1 | 3/2015 | Pech et al. | |
| 8,996,304 B2 * | 3/2015 | Needham | G01C 21/343 701/302 |
| 8,996,312 B1 * | 3/2015 | Freund | G01C 21/3461 455/457 |
| 9,043,150 B2 | 5/2015 | Forstall et al. | |
| 9,057,612 B1 | 6/2015 | Savvopoulos | |
| 9,082,134 B2 | 7/2015 | Gishen | |
| 9,171,464 B2 * | 10/2015 | Khetan | G08G 1/0962 |
| 9,194,717 B2 * | 11/2015 | Jouaux | G06Q 10/047 |
| 9,212,924 B1 | 12/2015 | Salowitz | |
| 9,285,231 B2 * | 3/2016 | Jouaux | G01C 21/34 |
| 9,317,813 B2 * | 4/2016 | McGavran | G01C 21/3617 |
| 9,396,508 B2 | 7/2016 | Otero et al. | |
| 9,418,672 B2 * | 8/2016 | Pylappan | H04L 5/00 |
| 9,482,296 B2 * | 11/2016 | Lemay | G01C 21/3673 |
| 9,500,494 B2 * | 11/2016 | van Os | G01C 21/3632 |
| 9,618,344 B2 * | 4/2017 | Harrison | G01S 19/48 |
| 9,940,679 B2 * | 4/2018 | Hampson | G06Q 10/109 |
| 2002/0069017 A1 | 6/2002 | Schmier et al. | |
| 2003/0019266 A1 | 1/2003 | Kanno | |
| 2003/0036848 A1 | 2/2003 | Sheha et al. | |
| 2003/0109266 A1 | 6/2003 | Rafiah et al. | |
| 2004/0158395 A1 | 8/2004 | Yamada et al. | |
| 2004/0181337 A1 | 9/2004 | Kawasaki et al. | |
| 2004/0233070 A1 | 11/2004 | Finnern | |
| 2005/0192025 A1 | 9/2005 | Kaplan | |
| 2005/0222760 A1 * | 10/2005 | Cabral | G01C 21/3492 701/423 |
| 2006/0149461 A1 * | 7/2006 | Rowley | G08G 1/096811 701/423 |
| 2006/0293847 A1 | 12/2006 | Marriott et al. | |
| 2007/0118520 A1 | 5/2007 | Bliss et al. | |
| 2007/0138347 A1 | 6/2007 | Ehlers | |
| 2007/0150179 A1 | 6/2007 | Pinkus et al. | |
| 2007/0194940 A1 * | 8/2007 | Valluru | G08B 21/02 340/573.4 |
| 2007/0208492 A1 * | 9/2007 | Downs | G08G 1/0104 701/117 |
| 2007/0208498 A1 | 9/2007 | Barker et al. | |
| 2007/0208502 A1 | 9/2007 | Sakamoto et al. | |
| 2007/0210937 A1 | 9/2007 | Smith et al. | |
| 2008/0068221 A1 | 3/2008 | Park | |
| 2008/0071465 A1 * | 3/2008 | Chapman | G01C 21/3691 701/117 |
| 2008/0147313 A1 | 6/2008 | Nesbitt | |
| 2008/0238941 A1 | 10/2008 | Kinnan et al. | |
| 2008/0291925 A1 | 11/2008 | Fisher et al. | |
| 2009/0018766 A1 | 1/2009 | Chen et al. | |
| 2009/0063041 A1 | 3/2009 | Hirose et al. | |
| 2009/0063048 A1 * | 3/2009 | Tsuji | G01C 21/30 701/455 |
| 2009/0112462 A1 * | 4/2009 | Lo | G01C 21/34 701/533 |
| 2009/0119001 A1 * | 5/2009 | Moussaeiff | G01C 21/005 701/532 |
| 2009/0143977 A1 * | 6/2009 | Beletski | G01C 21/362 701/533 |
| 2009/0171561 A1 * | 7/2009 | Geelen | G01C 21/3635 701/437 |
| 2009/0171575 A1 * | 7/2009 | Kim | G01C 21/3632 701/431 |
| 2009/0216732 A1 * | 8/2009 | Feng | G01C 21/3611 |
| 2010/0017118 A1 | 1/2010 | Dougherty | |
| 2010/0070173 A1 * | 3/2010 | Sakamoto | G01C 21/20 701/533 |
| 2010/0115030 A1 | 5/2010 | Hong et al. | |
| 2010/0123737 A1 | 5/2010 | Williamson et al. | |
| 2010/0125410 A1 * | 5/2010 | Hicks | B61L 25/025 701/533 |
| 2010/0153004 A1 | 6/2010 | Natsume | |
| 2010/0185386 A1 * | 7/2010 | Hess | G01C 21/3655 701/533 |
| 2010/0197325 A1 * | 8/2010 | Dredge | H04W 4/02 455/456.3 |
| 2010/0201707 A1 | 8/2010 | Rasmussen et al. | |
| 2010/0211303 A1 | 8/2010 | Stanton | |
| 2010/0253549 A1 * | 10/2010 | Kim | G08G 1/123 340/994 |
| 2010/0280853 A1 * | 11/2010 | Petralia | G06Q 10/02 705/5 |
| 2010/0318285 A1 * | 12/2010 | Kim | G08G 1/092 701/117 |
| 2011/0010084 A1 | 1/2011 | Carlsson et al. | |
| 2011/0077853 A1 | 3/2011 | Ranford et al. | |
| 2011/0106423 A1 * | 5/2011 | Morley | G01C 21/3423 701/533 |
| 2011/0112759 A1 | 5/2011 | Bast et al. | |
| 2011/0130950 A1 | 6/2011 | Wexler et al. | |
| 2011/0130961 A1 * | 6/2011 | Kuenzner | G01C 21/3664 701/533 |
| 2011/0177845 A1 | 7/2011 | Fasold | |
| 2011/0178697 A1 * | 7/2011 | Mincey | G01C 21/3644 701/532 |
| 2011/0181620 A1 | 7/2011 | Hung | |
| 2011/0191014 A1 | 8/2011 | Feng et al. | |
| 2011/0246054 A1 | 10/2011 | Toma | |
| 2011/0301843 A1 | 12/2011 | Gale et al. | |
| 2012/0004840 A1 | 1/2012 | Lee et al. | |
| 2012/0053830 A1 | 3/2012 | Bach | |
| 2012/0303263 A1 * | 11/2012 | Alam | G01C 21/32 701/410 |
| 2012/0303264 A1 * | 11/2012 | Su | G01C 21/3415 701/416 |

(56) References Cited

U.S. PATENT DOCUMENTS

| | | | |
|---|---|---|---|
| 2013/0035853 A1* | 2/2013 | Stout | G06T 17/05 701/438 |
| 2013/0041941 A1 | 2/2013 | Steinfeld | |
| 2013/0046456 A1* | 2/2013 | Scofield | G01C 21/3423 701/117 |
| 2013/0103313 A1* | 4/2013 | Moore | G01C 21/20 701/533 |
| 2013/0159908 A1* | 6/2013 | Mayerle | G06Q 10/06 715/771 |
| 2013/0191020 A1* | 7/2013 | Emani | G08G 1/096816 701/468 |
| 2013/0231859 A1* | 9/2013 | Kim | G01C 21/00 701/468 |
| 2013/0234868 A1* | 9/2013 | Koth | G08G 1/127 340/994 |
| 2013/0261956 A1 | 10/2013 | Marks | |
| 2013/0262222 A1 | 10/2013 | Gibson et al. | |
| 2013/0321456 A1 | 12/2013 | Hultquist et al. | |
| 2013/0322665 A1* | 12/2013 | Bennett | G08G 1/096855 381/300 |
| 2013/0322702 A1 | 12/2013 | Piemonte et al. | |
| 2013/0325320 A1* | 12/2013 | Dimitriadis | G01C 21/3415 701/414 |
| 2013/0325340 A1 | 12/2013 | Forstall et al. | |
| 2013/0325342 A1* | 12/2013 | Pylappan | G10L 21/00 701/533 |
| 2013/0326425 A1* | 12/2013 | Forstall | G01C 21/3638 715/851 |
| 2013/0328924 A1* | 12/2013 | Arikan | G06T 11/20 345/629 |
| 2013/0344802 A1* | 12/2013 | Armour | H04W 84/005 455/39 |
| 2013/0345959 A1* | 12/2013 | van Os | G01C 21/3632 701/408 |
| 2013/0345975 A1 | 12/2013 | Vulcano et al. | |
| 2014/0012498 A1* | 1/2014 | Gustafson | G01C 21/3423 701/468 |
| 2014/0032114 A1 | 1/2014 | Titus et al. | |
| 2014/0050122 A1 | 2/2014 | Pro et al. | |
| 2014/0095066 A1* | 4/2014 | Bouillet | G08G 1/0104 701/465 |
| 2014/0129135 A1 | 5/2014 | Holden et al. | |
| 2014/0129143 A1* | 5/2014 | Dave | G01C 21/3407 701/537 |
| 2014/0142834 A1* | 5/2014 | Maitra | G01C 21/3423 701/117 |
| 2014/0278070 A1* | 9/2014 | McGavran | G01C 21/00 701/465 |
| 2014/0278071 A1 | 9/2014 | San Filippo et al. | |
| 2014/0278616 A1 | 9/2014 | Stone et al. | |
| 2014/0340421 A1 | 11/2014 | Otero et al. | |
| 2014/0343852 A1 | 11/2014 | Pech et al. | |
| 2014/0358409 A1 | 12/2014 | Khoe et al. | |
| 2014/0358410 A1 | 12/2014 | Khoe et al. | |
| 2014/0358411 A1* | 12/2014 | Khoe | G08G 1/13 701/117 |
| 2014/0359510 A1* | 12/2014 | Graf | G01C 21/3667 715/771 |
| 2014/0364150 A1* | 12/2014 | Marti | G01C 21/34 455/456.3 |
| 2014/0365113 A1* | 12/2014 | McGavran | G01C 21/00 701/425 |
| 2014/0365122 A1* | 12/2014 | McGavran | G01C 21/3632 701/533 |
| 2014/0372904 A1* | 12/2014 | Liu | G01C 21/3415 715/753 |
| 2015/0046083 A1* | 2/2015 | Maitra | G08G 1/123 701/465 |
| 2015/0051823 A1* | 2/2015 | Joglekar | G08G 1/0145 701/118 |
| 2015/0106012 A1* | 4/2015 | Kandangath | G01C 21/3629 701/428 |
| 2015/0112579 A1 | 4/2015 | Finnis et al. | |
| 2015/0160024 A1 | 6/2015 | Fowe | |
| 2015/0168148 A1 | 6/2015 | Pech et al. | |
| 2015/0170229 A1 | 6/2015 | Flier et al. | |
| 2015/0177013 A1* | 6/2015 | Siliski | G01C 21/3423 701/433 |
| 2015/0186414 A1 | 7/2015 | Campbell | |
| 2015/0187127 A1* | 7/2015 | Jones | G06T 19/20 345/426 |
| 2015/0234529 A1 | 8/2015 | Kim et al. | |
| 2015/0253148 A1* | 9/2015 | Moore | G01C 21/367 701/532 |
| 2015/0262399 A1 | 9/2015 | Popescu | |
| 2015/0308844 A1 | 10/2015 | Shimazaki et al. | |
| 2015/0323331 A1 | 11/2015 | Lord et al. | |
| 2015/0332589 A1 | 11/2015 | Eichhorst | |
| 2015/0345951 A1 | 12/2015 | Dutta et al. | |
| 2015/0345973 A1 | 12/2015 | Flier et al. | |
| 2015/0345976 A1* | 12/2015 | Moore | G01C 21/3632 701/519 |
| 2015/0369621 A1 | 12/2015 | Abhyanker | |
| 2016/0003637 A1* | 1/2016 | Andersen | G06F 16/29 701/519 |
| 2016/0033289 A1 | 2/2016 | Tuukkanen et al. | |
| 2016/0102992 A1* | 4/2016 | Otero Diaz | G01C 21/3667 701/532 |
| 2016/0116296 A1 | 4/2016 | Nguyen et al. | |
| 2016/0202079 A1 | 7/2016 | Konig et al. | |
| 2016/0216126 A1 | 7/2016 | Park et al. | |
| 2016/0216130 A1* | 7/2016 | Abramson | G01C 21/3626 |
| 2016/0231129 A1 | 8/2016 | Erez et al. | |
| 2016/0282129 A1 | 9/2016 | Wang et al. | |
| 2016/0290818 A1 | 10/2016 | Kim et al. | |
| 2016/0291820 A1 | 10/2016 | Mak et al. | |
| 2016/0298977 A1 | 10/2016 | Newlin et al. | |
| 2016/0341564 A1* | 11/2016 | Cheng | G01C 21/3641 |
| 2016/0356603 A1 | 12/2016 | Hajj et al. | |
| 2016/0356610 A1 | 12/2016 | O'Beirne et al. | |
| 2016/0356613 A1 | 12/2016 | Hajj et al. | |
| 2016/0356614 A1 | 12/2016 | O'Beirne et al. | |
| 2016/0356617 A1 | 12/2016 | Verosub et al. | |
| 2016/0356624 A1 | 12/2016 | O'Beirne et al. | |
| 2016/0356625 A1* | 12/2016 | O'Beirne | G01C 21/3676 |
| 2016/0358469 A1 | 12/2016 | Pirwani et al. | |
| 2016/0358470 A1 | 12/2016 | Pirwani | |
| 2016/0358471 A1 | 12/2016 | Hajj et al. | |
| 2017/0010118 A1 | 1/2017 | Hajj et al. | |
| 2017/0031926 A1 | 2/2017 | Katircioglu et al. | |
| 2017/0074669 A1 | 3/2017 | Newlin et al. | |
| 2017/0343376 A9* | 11/2017 | O'Beirne | G01C 21/3673 |
| 2018/0066955 A1* | 3/2018 | O'Beirne | G01C 21/3676 |
| 2018/0212684 A1 | 7/2018 | Aoyama et al. | |

OTHER PUBLICATIONS

Sasha Gontmakher, "Know when your bus is late with live transit updates in Google Maps", Official Google Blog. Published Jun. 8, 2011. <https://googleblog.blogspot.com/2011/06/know-when-your-bus-is-late-with-live.html>.

METRO "Schedules Bus & Rail" <http://www.ridemetro.org/pages/schedulesbusrail.aspx>.

METRO METRORail Red Line Map & Schedules <http://www.ridemetro.org/pages/RedLine.aspx>.

Maryland Transit Administration, "Light Rail Schedule" <http://mta.maryland.gov/LRTracker/Home/TrainSchedule>.

Bruce Nourish: "Google Maps Introduces New, Smart Transit Routing", Seattle Transit Blog, May 17, 2013 (May 17, 2013), XP002761347, Retrieved from the Internet: URL: https://seattletransitblog.com/2013/05/17/google-maps-introduces-guidebook-routing/.

Bast, Hannah, et al., "Frequency-Based Search for Public Transit", Proceedings of the 22nd ACM Sigspatial International Conference on Advances in Geographic Information Systems, Sigspatial '14, Nov. 4-7, 2014, 19 pages, ACM, Dallas/Fort Worth, USA.

Author Unknown, "Transit-BEST Bus & Rail App How to Navigate Major Cities" MrApp4That, Sep. 24, 2014, available at https://www.youtube.com/watch?v=IEjo_PWWOAQ, YouTube, USA.

(56) References Cited

OTHER PUBLICATIONS

Vuchic, "Role of Organization of Transfers in Transit Networks", 1992, Proceedings of the 6th World Conference on Transport Research.

* cited by examiner

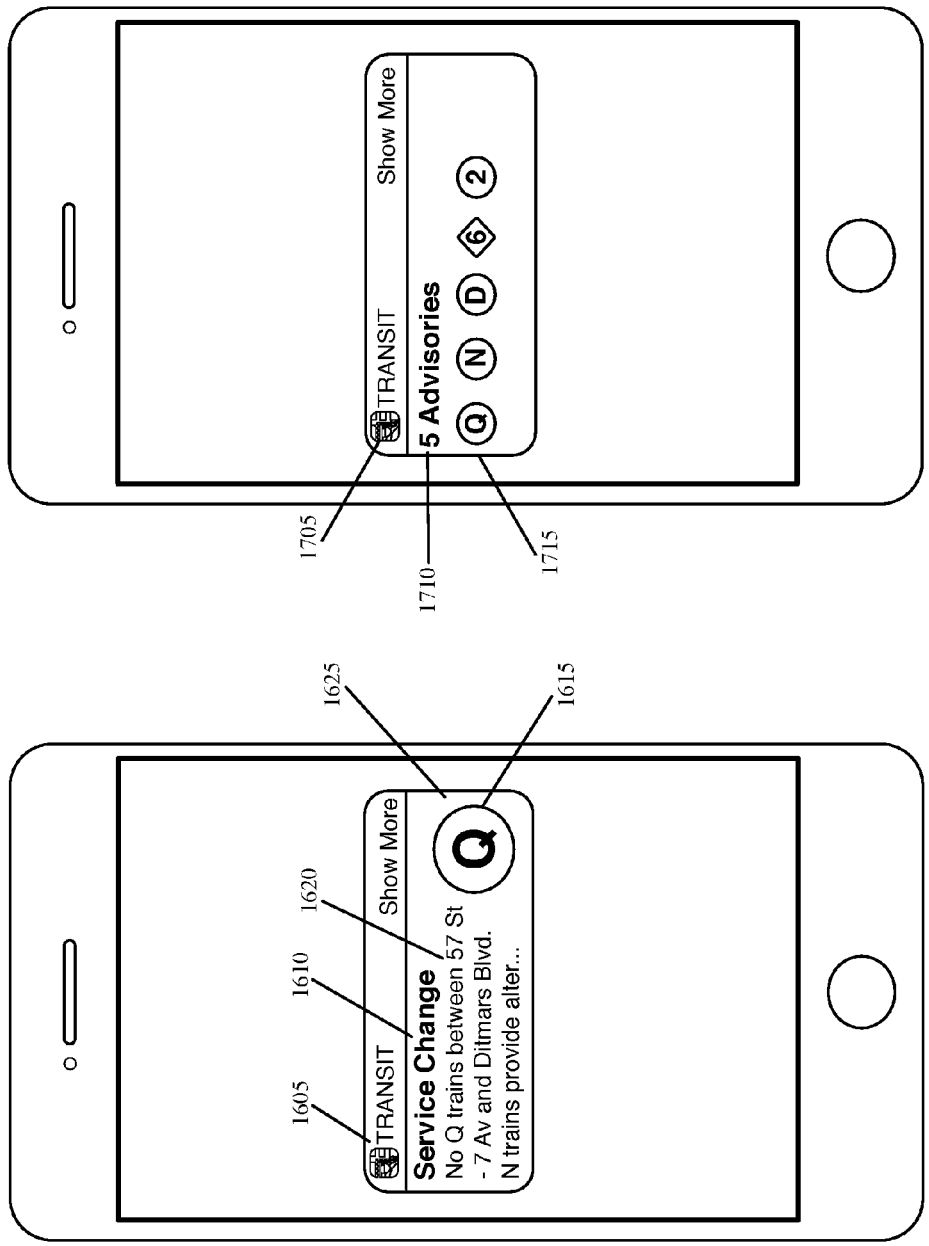

TRANSIT INCIDENT REPORTING

BACKGROUND

With proliferation of smartphones, users are more than ever using navigation applications to guide their travels. These navigation applications not only provide driving and walking directions, but also provide information about how to travel by using transit routes. Despite their popularity, these navigation applications still need to provide easier ways for users to access data regarding transit navigation events.

BRIEF SUMMARY

Some embodiments of the invention provide a method for displaying on a device incident reports regarding transit lines and stations. Through a map application executing on the device, the method of some embodiments receives an incident report regarding a transit line or station of interest. The method displays the incident report in an incident reporting display area that is accessible on the device without the opening of the map application. The incident report in some embodiments includes a set of zero or more incidents associated with the transit line or station. In some embodiments, a reported incident can be an incident about the overall transit line, a portion of the transit line, or one or more stations along the transit line. A station is a location along a transit line at which a transit vehicle that travels the transit line stops. In some embodiments, the transit vehicle passengers can typically get on or off the transit vehicle at a transit station.

In some embodiments, an operating system (OS) of the device provides an affordance to view the incident reporting display area without opening of the map application. In some of these embodiments, the device is a mobile device, and the affordance is accessible through a display page (e.g., home page) of the mobile device that is generated by the device OS. The selection of the affordance in some embodiments directs the method to present a display pane for displaying incident reports regarding one or more transit lines or stations of interest. In some embodiments, the display pane is presented on a display page that appears to one side (e.g., left side) of the home page of the mobile device. The method of some embodiments is implemented by the device OS (e.g., a service process provided by the OS), while in other embodiments, the method is implemented by a process outside of the device OS and the map application.

In response to the selection of the affordance, the method of some embodiments directs the map application to identify incidents associated with any transit line or station of interest. In some embodiments, the map application identifies a transit line or station to be of interest when it has been designated as such by a user of the device. Conjunctively, or alternatively, the map application of some embodiments automatically identifies, without any user direct input, transit lines or stations that are repeatedly used by the device (e.g., to navigate routes) to be transit lines or stations of interest.

After directing the map application to identify incidents associated with any transit line or station of interest, the method receives from the map application a set of incidents for each transit line or station of interest. The set of incidents for each transit line or station includes zero incidents when there are no incidents associated with the line or station, or one or more incidents when there are one or more incidents associated with the line or station. When no transit line or station of interest has any associated incident, the method in some embodiments provides a notice in the incident reporting display area that there is no incident associated with any transit line or station of interest. This notice is accompanied by a list of the transit lines or stations of interest.

On the other hand, when at least one transit line or station of interest has an associated incident, the method in some embodiments provides a notice in the incident reporting display area that identifies at least one incident associated with at least one transit line or station. For example, in some embodiments, the method initially displays in the incident reporting display area, a condensed list of transit lines or stations with associated incident information. Upon selection of an affordance associated with the condensed list, the method in these embodiments displays an expanded list that provides additional information about at least one set of incidents associated with at least one transit line or station of interest. In some embodiments, the expanded list is a scrollable list. Also, in some embodiments, the expanded list provides information about incidents associated with one set of transit lines or stations, while specifying that no incidents exist for a second set of transit lines or stations. The device OS (e.g., a framework process of the device) in some embodiments creates the condensed and expanded versions of the incident reporting display area, but directs the map application to generate the content for display in each of these areas.

Upon selection of an affordance associated with an incident identified in the incident reporting display area (e.g., upon selection of one of the incidents displayed on the condensed list or expanded list) for a transit line or station, the method opens the map application to present a display pane (e.g., an advisory card or a transit line card) to provide additional information about the set of incidents associated with the transit line or station. In some embodiments, this display pane is displayed over a map that contains the transit line or station. In other embodiments, selection of an incident in the incident reporting display area directs the map application to display the location of the incident on a map.

The method of some embodiments identifies both transit lines of interest and transit stations of interest, and displays incident reports regarding incidents on both transit lines of interest and transit stations of interest. However, other embodiments do not identify both transit lines and transit stations of interest. The method of some embodiments just identifies transit lines of interest, while the method of other embodiments just identifies transit stations of interest. Accordingly, in some embodiments, the method identifies transit stations of interest, and then displays incident reports for the identified transit stations and the transit lines that use these identified stations. In still other embodiments, the method identifies transit lines of interest, and then displays incident reports for the identified transit lines of interest, and the transit stations along the identified transit lines of interest. Also, the method of some embodiments only displays incident reports for transit lines, while the method of other embodiments only displays incident reports for transit stations.

One of ordinary skill will realize that the preceding Summary is intended to serve as a brief introduction to some inventive features of some embodiments. Moreover, this Summary is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIGS. 14-17 illustrate four different examples of transit incident reports that the map application can generate and display in the condensed incident reporting pane.

DETAILED DESCRIPTION

Figure 1:
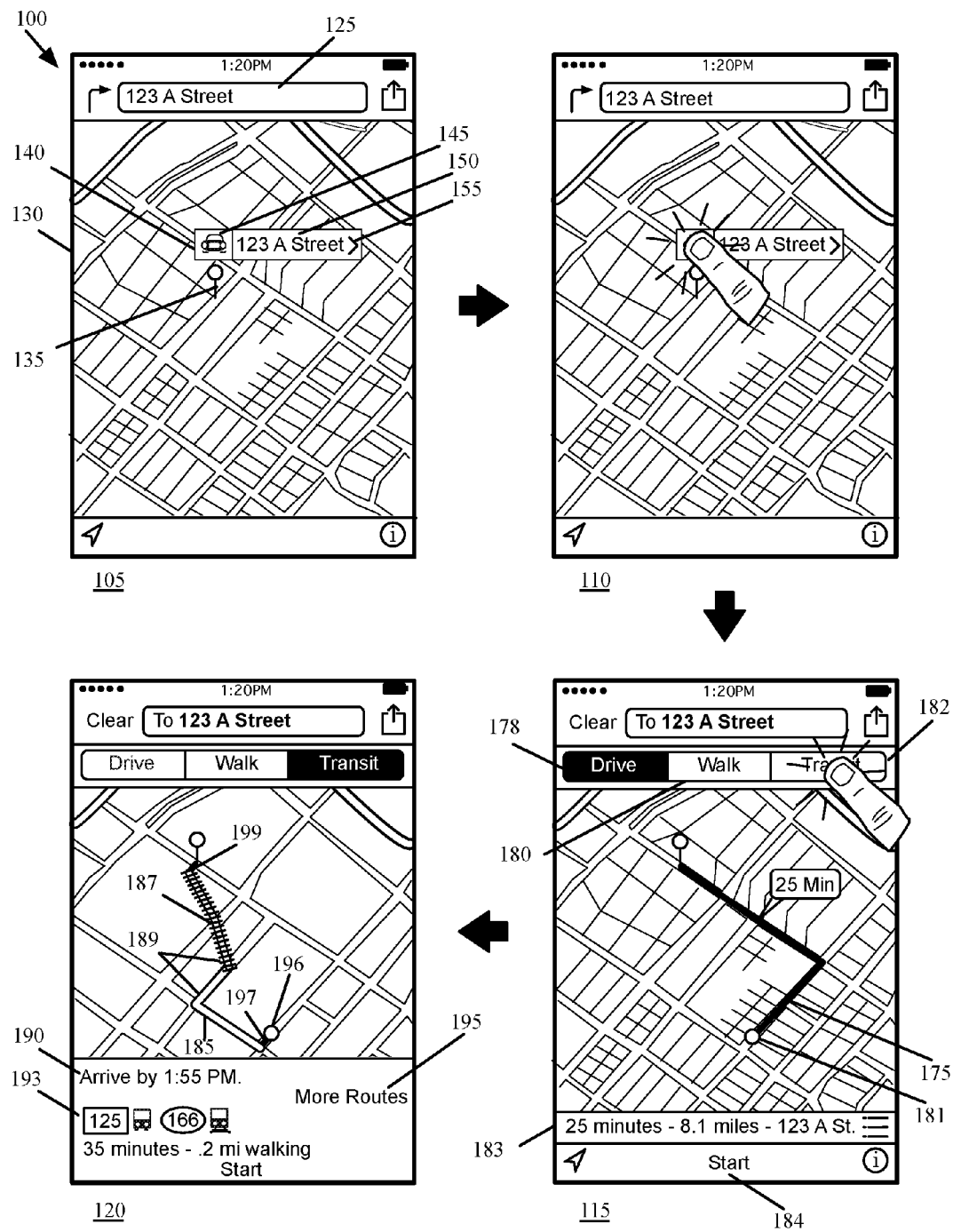
FIG. 1 illustrates how the transit navigation mode of a map application can be selected.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a notification manager for displaying on a device incident reports regarding transit lines and stations. Through a map application executing on the device, the notification manager of some embodiments receives an incident report regarding a transit line or station of interest. The notification manager displays the incident report in an incident reporting display area that is accessible on the device without opening of the map application. The incident report in some embodiments includes a set of zero or more incidents associated with the transit line or station. In some embodiments, a reported incident can be an incident about the overall transit line, a portion of the transit line, or one or more stations along the transit line. A station is a location along a transit line at which a transit vehicle that travels the transit line stops. In some embodiments, the transit vehicle passengers can typically get on or off the transit vehicle at a transit station.

In some embodiments, an operating system (OS) of the device provides an affordance to view the incident reporting display area without opening of the map application. In some of these embodiments, the device is a mobile device, and the affordance is accessible through a display page (e.g., home page) of the mobile device that is generated by the device OS. The selection of the affordance in some embodiments directs the notification manager to present a display pane for displaying incident reports regarding one or more transit lines or stations of interest. In some embodiments, the display pane is presented on a display page that appears to one side (e.g., left side) of the home page of the mobile device. The notification manager of some embodiments is implemented by the device OS (e.g., a service process provided by the OS), while in other embodiments, the notification manager is implemented by a process outside of the device OS and the map application.

In response to the selection of the affordance, the notification manager of some embodiments directs the map application to identify incidents associated with any transit line or station of interest. In some embodiments, the map application identifies a transit line or station to be of interest when it has been designated as such by a user of the device. Conjunctively, or alternatively, the map application of some embodiments automatically identifies, without any user direct input, transit lines or stations that are repeatedly used by the device (e.g., to navigate routes) to be transit lines or stations of interest.

After directing the map application to identify incidents associated with any transit line or station of interest, the notification manager receives from the map application a set of incidents for each transit line or station of interest. The set of incidents for each transit line or station includes zero incidents when there are no incidents associated with the line or station, or one or more incidents when there are one or more incidents associated with the line or station. When no transit line or station of interest has any associated incident, the notification manager in some embodiments provides a notice in the incident reporting display area that there is no incident associated with any transit line or station of interest. This notice is accompanied by a list of the transit lines or stations of interest.

On the other hand, when at least one transit line or station of interest has an associated incident, the notification manager in some embodiments provides a notice in the incident reporting display area that identifies at least one incident associated with at least one transit line or station. For example, in some embodiments, the notification manager initially displays in the incident reporting display area, a condensed list of transit lines or stations with associated incident information. Upon selection of an affordance associated with the condensed list, the notification manager in these embodiments displays an expanded list that provides additional information about at least one set of incidents associated with at least one transit line or station of interest. In some embodiments, the expanded list is a scrollable list.

Also, in some embodiments, the expanded list provides information about incidents associated with one set of transit lines or stations, while specifying that no incidents exist for a second set of transit lines or stations. The device OS (e.g., a framework process of the device) in some embodiments creates the condensed and expanded versions of the incident reporting display area, but directs the map application to generate the content for display in each of these areas.

Upon selection of an affordance associated with an incident identified in the incident reporting display area (e.g., upon selection of one of the incidents displayed on the condensed list or expanded list) for a transit line or station, the notification manager directs the map application to present a display pane (e.g., an advisory card or a transit line card) to provide additional information about the set of incidents associated with the transit line or station. In some embodiments, this display pane is displayed over a map that contains the transit line or station. In other embodiments, selection of an incident in the incident reporting display area directs the map application to display the location of the incident on a map.

The notification manager of some embodiments identifies both transit lines of interest and transit stations of interest, and displays incident reports regarding incidents on both transit lines of interest and transit stations of interest. However, other embodiments do not identify both transit lines and transit stations of interest. The notification manager of some embodiments just identifies transit lines of interest, while the notification manager of other embodiments just identifies transit stations of interest. Accordingly, in some embodiments, the notification manager identifies transit stations of interest, and then displays incident reports for the identified transit stations, and the transit lines that use these identified stations. In still other embodiments, the notification manager identifies transit lines of interest, and then displays incident reports for the identified transit lines of interest, and the transit stations along the identified transit lines of interest. Also, the notification manager of some embodiments only displays incident reports for transit lines, while the notification manager of other embodiments only displays incident reports for transit stations.

Several more detailed examples of displaying incident reports for transit lines or stations of interest will be provided below by reference to FIGS. 10-20. However, before describing these additional examples, several embodiments will be described below for showing information about transit incidents in a map application that displays transit maps, allows these maps to be browsed, and provides transit navigation presentations.

The map application of some embodiments provides an efficient transit navigation modality for planning a transit trip by browsing and selecting a transit route and navigating the selected transit route. The map application of some embodiments operates in a map-browsing mode to allow a user to browse a map of a locality and to perform searches for map locations based on addresses, names (e.g., people, businesses, etc.) or other search parameters. The map application of some such embodiments also has a navigation mode that includes a driving navigation mode to provide driving navigation directions, a walking navigation mode to provide walking navigation directions, and a transit navigation mode to provide transit navigation directions.

The map application of some embodiments, upon receiving a request to display a route in transit mode, identifies one or more transit routes between two locations and displays the best possible transit route among the identified routes to the user. Specifically, to identify the transit routes, the application of some embodiments examines different transit legs that one or more transit vehicles of one or more transit systems travel from locations near a specified starting location (e.g., the current location of the device) to locations near a specified destination. In some embodiments, each transit leg of a transit route includes a section of the transit route that is travelled by a transit vehicle of a transit line. A transit leg may also include a walking distance that is more than a threshold distance.

In examining the transit legs, the application of some embodiments takes into account a set of transit preferences that are customized (i.e., set or adjusted) by the user. For instance, in some embodiments, a user may adjust the date and time of the departure (from, e.g., the current location of the user) to a particular date and time instead of the current time. Conversely, the user may prefer a particular type of transit vehicle (i.e., a transit vehicle of a particular transit system) over the other types. For example, the user might rather ride a subway train over a bus for a particular transit leg of a transit route, or use only ground transportation for an entire transit route (e.g., a transit route without any ferry trips).

Based on the examination of the transit legs, the map application identifies one or more transit routes that use one or more transit vehicles of one or more transit systems in some embodiments. The identified routes may also include one or more pedestrian routes that are between the different transit trips, between the starting location and the first transit trip, and between the last transit trip and the destination location. After identifying the transit routes, the map application selects one of the identified transit routes based on a set of criteria (e.g., fastest route, shortest route, route with least amount of walking, route requiring least amount of transit vehicle changes, route requiring least amount of transit system changes, etc.), and displays this selected route over the map presentation. In some embodiments, the selection criteria set relies on two or more selection parameters. Also, in some embodiments, the selection criteria set is different in different transit markets and/or in different time periods in the same transit market.

The map application of some embodiments displays the best identified route in its entirety over a portion of a map presentation of a geographical area. The application of some such embodiments displays the identified route in multiple sections (transit legs) each of which is traveled by a particular transit vehicle. The map application uses different graphical representations for different portions of a displayed transit route that are travelled by different types of transit vehicles or require walking. In some embodiments, the different types of transit vehicles that are presented by different graphical representations include buses, subway trains, rail trains (e.g., light rail trains and heavy rail trains), and ferries. Each of these four categories may include multiple different subcategories in some embodiments. When the selected transit route includes multiple transit vehicles of the same type (same transit system), each transit vehicle of the same transit system is distinguished from the other transit vehicles by a different line of the transit vehicle (e.g., a different subway line, a different bus line, etc.).

FIG. 1 illustrates a map application that provides transit navigation presentations of some embodiments of the invention. In some embodiments, the map application executes on a mobile device (e.g., a smartphone, a tablet, a laptop, etc.) with a touch-sensitive display screen. Although, all the features and concepts of the map application discussed below are equally applicable to other devices with non-touch-sensitive display screens. The map application can operate in a map-browsing mode to allow a user to browse a map of a locality and to perform searches for map locations based on addresses, names (e.g., people, businesses, etc.) or other search parameters. The application also has a navigation mode that includes a driving navigation mode to provide driving navigation directions, a walking navigation mode to provide walking navigation directions, and a transit navigation mode to provide transit navigation directions.

FIG. 1 illustrates, in four operational stages 105-120 of the user interface (UI) 100 of the map application, how the transit navigation mode of the map application can be selected by requesting for a route from the current location of the user to a searched destination. The application then displays a route that is travelled by a combination of two different transit vehicles (of two different types) between the current location of the user and the searched destination. Some embodiments provide the user with a search box to search for a particular location. The user may then enter an address of a particular place or alternatively a name of the place in the search box. When the address (or name) of the place is specified, the map application of some embodiments provides an indicator (e.g., a pin) over a presentation of the map to display the exact location of the place on the map presentation. In addition, some such embodiments display a banner (e.g., over the pin) with selectable controls for providing more information about the place.

The first stage 105 of FIG. 1 illustrates a search box 125, a map presentation area 130 that displays a map of a geographical area, a pin 135, and a banner 140. The banner 140 includes a selectable route control 145 (which is depicted as a presentation of a car), a name 150 of the searched place, and a selectable control 155 (which is depicted as a right arrow). In the search box 125, a user can enter a search parameter to search for a particular location for display in the map presentation area 130. In some embodiments, the search parameter can be an address or a name of an entity (e.g., business, organization, person, etc.), or some other parameter. When the map application can identify one or more locations for the search parameter that it receives, the map application in some embodiments (1) displays, in the presentation area 130, a map that displays some or all of the identified locations, and (2) displays a pin 135 or other location indicator for each displayed location to identify the position of the identified location. Also, in some embodiments, the map application displays a banner 140 over one of the pins 135 for providing access to more information about the location identified by the pin. The banner also provides some information about the identified location.

The first stage 105 of the figure shows that the user has entered an address in the search box 125 (123 A Street). As a result, the application displays, in the map presentation area 130, a map of a particular geographical area in which the entered address is located. This stage also shows that the application further displays (1) the pin 135 over the map presentation to identify the location of the entered address on the map and (2) the banner 140 over the pin. As shown, this banner includes the address "123 A Street," the route control 145, and the selectable control 155, which when selected causes the map application to present a display area (e.g., a placecard) that provides more information about the identified location.

The second stage 110 illustrates that the user selects the selectable route control 145 (e.g., by performing a gestural input on the touch-sensitive display screen of the device, such as tapping the user's finger on the control 145). Selection of the route control 145 causes the application to display a route overview (e.g., a driving route) from the current location of the user to the searched location (i.e., to the pin 135) over the map presented in the map presentation area 130. In some embodiments, the route control 145 is also for initiating a navigation experience. For instance, the map application of some embodiments provides one or more routes to the location of the pin from the current location of the device upon receiving a selection of the route control. When a route is selected, the map application can start operating in a navigation mode or in a route inspection mode depending on the user's next selection.

The third stage 115 shows that the displayed route 175 is laid over the region map. The third stage 115 also shows three navigation mode controls, which are the driving mode control 178, the walking mode control 180, and the transit mode control 182. Through these controls, the user can direct the map application to provide one or more driving routes, walking routes, and transit routes from the specified starting location (i.e., the device's current location in this example) to the specified destination (i.e., to 123 A Street in this example). The third stage 115 shows the driving mode control 178 highlighted to indicate that the route 175 that the application initially provides is a driving route. In some embodiments, the map application dynamically determines whether to provide an initial driving, walking or transit route based on the distance to the destination, the locality in which the device currently operates, and the detected current mode of transportation for the device (if any).

The map application of some embodiments makes a dynamic determination for the default mode of navigation based on a set of motion data that it receives through the different sensors of the device and a set of rules that specifies the default mode of navigation under different detected conditions. For instance, the application detects the current user activity (e.g., driving, walking, biking, etc.) from motion data that some detecting sensors of the device collect and based on the determined activity, automatically sets the default navigation mode to the pedestrian mode (i.e., walking mode) or driving mode. For instance if the application determines, based on the motion data it receives from the motion sensors, that the user of the device is in a vehicle, the application sets the default navigation mode to driving mode (as illustrated in this example).

In some embodiments, the map application uses a combination of the motion data that it receives through the motion sensors, and the distance to the desired destination in order to determine which navigation mode should be the default mode. For instance, in some embodiments, the application does not set the default mode to the pedestrian mode when the destination location is not within a threshold distance (e.g., two miles) from the current position of the user even if the motion data indicate that the user is walking. Conversely, the application of some embodiments does not set the default mode to the driving mode when the destination location is within a threshold distance (e.g., 0.5 miles) from the current position of the user and the motion data indicate that the user is not driving.

The third stage also shows that for the displayed route, the map application provides information about the route in a display area 183. For instance, in the driving mode, the display area 183 displays the driving distance and duration to the destination from the current location of the device. The third stage also shows that the route-overview presentation includes a start control 184 for starting a turn-by-turn navigation experience to the destination based on the currently selected navigation mode (e.g., driving mode, walking mode, or transit mode). For example, when the map application is displaying a transit route overview presentation in the transit mode, selection of the start control 184 directs the map application to start a transit navigation presentation that provides transit navigation directions from the device's current location to the destination. Navigating a transit route is described is more detail in the filed U.S. patent application Ser. No. 14/869,570, entitled "Transit Navigation", which is incorporated herein by reference.

The third stage shows that the user selects the transit control 182 (e.g., by tapping on the tab 182) to change the navigation mode of the application from a driving navigation mode to transit navigation mode. Upon receiving this request, the map application of some embodiments identifies one or more transit routes to the specified destination, selects one of the identified transit routes as the best possible transit route based on a set of criteria, and displays the selected transit route 189, as shown in the fourth stage 120.

The map application of some embodiments, upon receiving a request to display a route in transit mode, identifies the best possible transit route among several different routes between two locations and displays the route to the user. Specifically, to identify the transit routes, the application of some embodiments examines trips that one or more transit vehicles of one or more transit systems make from locations nearby a specified starting location (e.g., the current location of the device) to locations near the specified destination. Based on this examination, the application identifies one or more transit routes that use one or more transit vehicles of one or more transit systems in some embodiments.

After identifying the transit routes, the map application then selects one of the identified transit routes based on a set of criteria (e.g., fastest route, shortest route, route with least amount of walking, route requiring least amount of transit vehicle changes, route requiring least amount of transit system changes, etc.), and displays this identified route over the map presentation in the presentation area 130. In some embodiments, the selection criteria set relies on two or more selection parameters. Also, in some embodiments, the selection criteria set is different in different transit markets and/or in different time periods in the same transit market.

Although in the descriptions above and below, the map application is identified as the performer of actions such as identification and ranking of the transit routes, in some embodiments some or all of these actions are performed by a mapping service, which then provides the results to the map application. For instance, in some embodiments the identification of different transit routes and selection of the best possible route among the identified transit routes is done by a mapping service that runs on one or more dedicated servers.

The mapping service of some embodiments is the same mapping service that provides other map browsing and navigation data (e.g., routing data, traffic data, map tiles, etc.) to the map application. In some other embodiments, the mapping service is a designated service for providing transit data to the map application. The mapping service of some embodiments receives a request for transit routes, which includes the starting and destination locations. The service then identifies a set of available transit routes based on the user preferences, ranks the identified transit routes based on a set of criteria, and returns the ranked identified transit routes to the map application. The map application then displays the highest ranked transit route as the selected transit route in the transit navigation mode to the user.

In some embodiments, the application ranks the identified routes based on the set of criteria and some other factors. For instance, the application initially ranks the identified routes with the shortest transit route having the highest ranking. The application then requests for and receives real time incident (e.g., traffic) data for the identified routes (e.g., from a set of dedicated servers, from a designated incident curator that gathers incident data from different sources, etc.). Based on the received data, the application of some embodiments rearranges the routes and ranks them again for a second time. The application then displays the highest ranked (secondary ranked) transit route in the route presentation area. In some embodiments, as discussed above, a mapping service identifies and ranks the transit routes. In some such embodiments, the mapping service requests the real time incident data from dedicated servers in order to rank the transit routes. In some embodiments, the mapping service gathers and maintains the incident data directly (e.g., through an incident curator module of the mapping service).

The fourth stage 120 illustrates that the route 175 in the previous stage 115, is now replaced by a transit route 189 as a result of selecting the transit navigation mode as the operational mode of the application. The preferred criterion in this example is the least amount of walking and therefore the transit route shown in the figure is selected as the best transit route because it includes the minimal walking distance between the departure point, the transit stations, and the destination point.

In addition to a predefined set of criteria, the application of some embodiments selects the best possible route based on a set of transit preferences set by a user. The user in some embodiments customizes the application by setting or adjusting a set of transit preferences provided by the map application. For instance, in some embodiments, a user may adjust the date and time of the departure to a particular date and time instead of the current time. In some embodiments, the user may prefer a particular type of transit vehicle (i.e., a transit vehicle of a particular transit system) over the other types. For example, the user might rather ride a subway train over a bus in a particular transit trip, or use only ground transportation for an entire transit route (e.g., a transit route that does not include a ferry trip). Customizing the transit routes is further described in the filed U.S. patent application Ser. No. 14/869,403, entitled "Map Application with Transit Navigation Mode", which is incorporated herein by reference.

Some embodiments display the best route in its entirety over a portion of a map of a geographical area. Some such embodiments display the route in multiple sections each of which is traveled by a particular transit vehicle. In some embodiments, the map application uses different representations for different portions of a displayed transit route that are travelled by different transit vehicles or require walking. The displayed transit route in the fourth stage 120 includes two different portions 185 and 187. The first portion (leg) of the transit route (i.e., the route portion 185) is travelled by a bus, while the second portion (i.e., the route portion 187) is travelled by a subway train. The two portions are displayed by two different graphical representations (e.g., a bus route representation for the bus portion and a rail representation for the train portion) to differentiate the bus and subway portions from each other. In the discussions below, a transit leg refers to a portion of a transit route that starts or ends with a transit maneuver that requires a transit vehicle change or a walking portion with a minimum threshold distance in a transit route.

In the illustrated example, two small walking portions 197 and 199 are also displayed. Specifically, the walking portion 197 represents the walking distance from the current location of the device (user) 196 to the first transit station (i.e., the first bus stop of the transit route). The second walking portion 199 represents the walking distance from the last transit station (i.e., the last subway station of the transit route) to the destination location. Although these walking portions are part of the path that the user of the device travels to reach the destination, as will be discussed in more detail below, they are not considered as separate legs of the transit route in some embodiments. Some such embodiments identify a walking portion of a transit route as a transit leg of the route only if the walking distance is equal to or more than a threshold length (e.g., more than half a mile, more than one mile, etc.). Any walking portions less than the threshold will not be identified as a walking leg of the transit route in these embodiments.

In some embodiments, the different types of transit vehicles that are presented by different graphical representations include buses, subway trains, rail trains (e.g., light rail trains and heavy rail trains), and ferries. Each of these four categories may include multiple different subcategories in some embodiments. For example, the bus category may include single-deckers, double-deckers, rigid buses, articulated buses, etc. that are provided by the same or different bus service providers. As another example, a light rail train may include many different types of city trains such as streetcars, trams, trolleys, etc. that are provided by the same or different light rail service providers. Additionally, the best route may include multiple transit vehicles of the same type (same transit system) in some embodiments. In such a case, each transit vehicle of the same transit system is distinguished from the other transit vehicles by a different line of the transit vehicle. For example a transit route may include three different bus legs that are serviced by three buses of three different bus lines.

Figure 3:
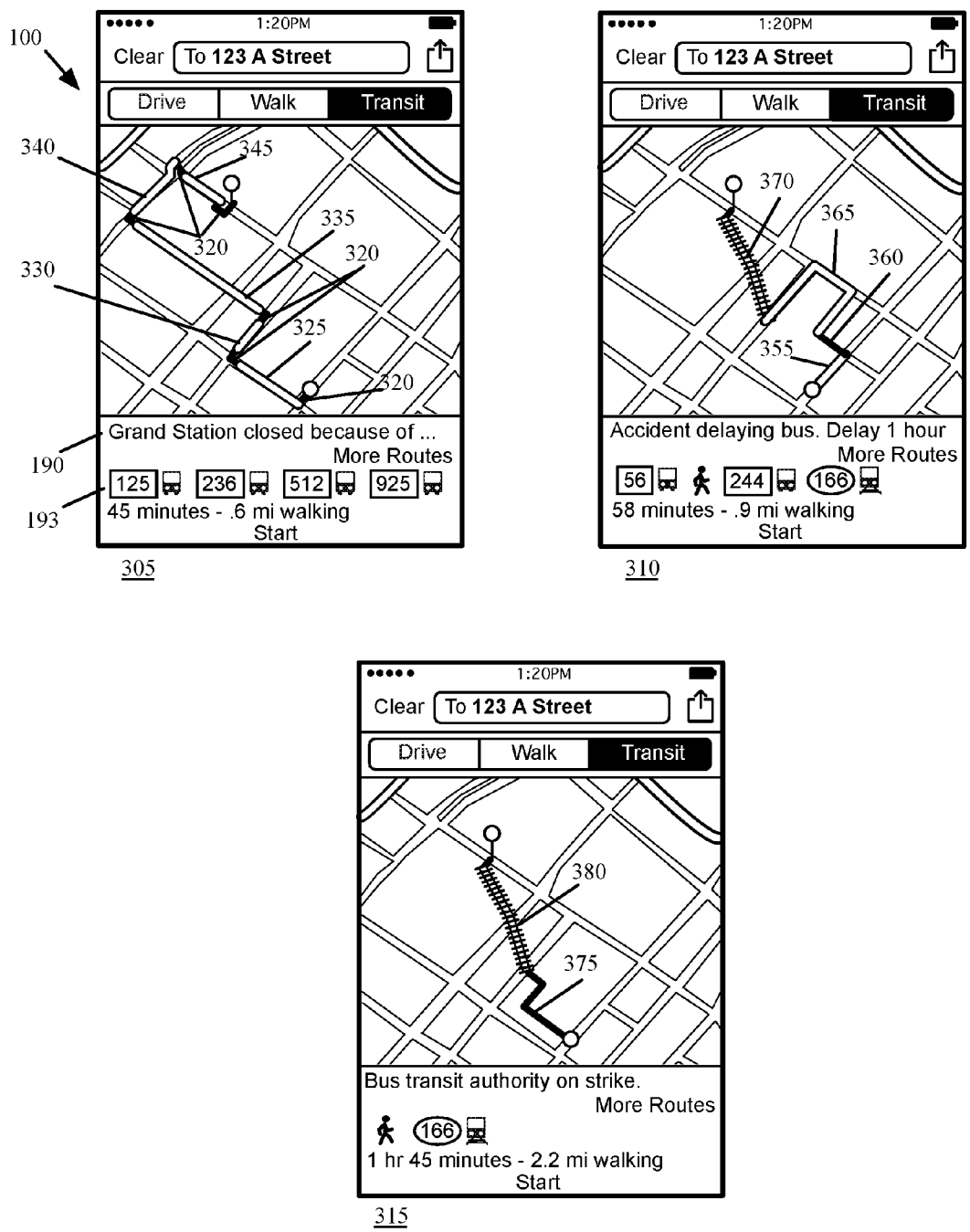
FIG. 3 illustrates the incident display area displaying three different messages, in three different examples, for three different conditions related to the displayed transit route.

The display area 183 of the third stage 115 is divided in the fourth stage 120 into two display areas 190 and 193. The incident display area 190 currently shows the arrival time at the destination. However, this display area, as described in more detail below by reference to FIG. 3, is also for displaying various other transit information that can help the user to plan the transit trip more easily. A few examples of this additional transit information include (1) any incident that has occurred along the displayed transit route, (2) an incident that has occurred along another route which has caused the displayed route ranked better than the other route, (3) departure time or frequency of departures for the first leg of the transit route, and (4) departure frequency of the entire route.

The display area 193 is for displaying a route summary presentation for the displayed transit route. More specifically, this display area shows a different representation for each transit vehicle for each leg of the transit route along with the line of the transit vehicle. As illustrated in this example, the display area 193 currently shows a representation for a bus of the line 125 that travels the first leg of the transit route and a representation for a subway train of the line 166 that travels the second leg of the transit route.

Each representation for a transit vehicle, in the illustrated example, includes a logo that represents the type of the transit vehicle (e.g., a bus logo, a subway train logo, etc.), and a geometric shape that (1) includes the line of the transit vehicle and (2) is different for different types of transit vehicles (e.g., a rectangle for bus lines, an ellipse for subway lines, etc.). However, one of ordinary skill in the art would realize that the different types of transit vehicles could be represented in different embodiments differently. For example some embodiments provide different colors for the different representations to distinguish them from each other while other embodiments provide different graphical shapes that represent different types of transit vehicles.

The fourth stage 120 also shows a selectable More Routes control 195 for showing more routes. As discussed above, the displayed transit route is the best transit route that the application selects among a set of different routes based on a set of different criteria as well as a set of user preferences. Selecting the control 195 causes the application to show the other routes in the set of different routes in a separate display area, as will be discussed in further detail below by reference to FIG. 5.

Figure 2:
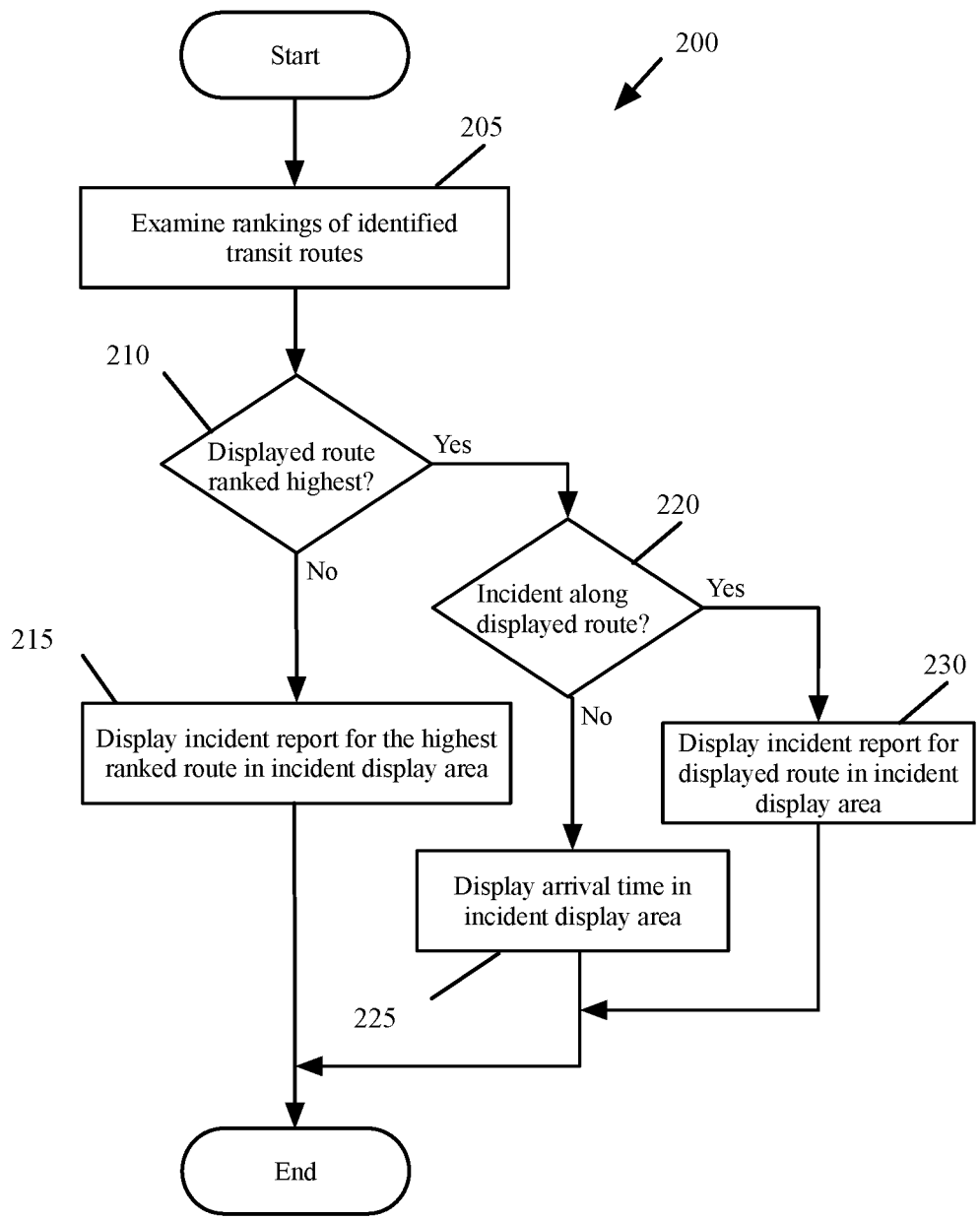
FIG. 2 conceptually illustrates a process that the map application of some embodiments performs to determine what type of transit information should be displayed in the incident display area.

As described above, the incident display area of the map application displays different useful transit information about a transit route that is selected and displayed to the user. FIG. 2 conceptually illustrates a process 200 that the map application of some embodiments performs to determine what type of transit information should be displayed in the incident display area.

The process 200 begins by examining (at 205) the identified transit routes between a departure location and a destination location. As discussed above, after a user requests for transit routes between two specific locations, some embodiments identify one or more transit routes that each uses a combination of one or more transit vehicles from locations near the first specific location (e.g., current location of the user) to locations near the second specific location (e.g., a searched location). These embodiments then rank the identified transit routes based on a set of criteria (e.g., quickness of the route, shortness of the route, least number of change of transit vehicles, etc.). The embodiments then rearrange the transit routes based on a set of real time transit data received from one or more dedicated servers or through social media networks or other types of private and public networks. That is, before displaying the highest ranked transit route to the user, these embodiments request for traffic data (e.g., any potential incident) that can affect the identified routes.

Some embodiments rank the rearranged identified routes for the second time (a secondary ranking) and display the routes based on their new rankings. This secondary ranking, however, is temporary because it can change any time based on the traffic news that the application receives in real time, whereas the original ranking is considered as primary ranking because it does not change (unless and until the transit service providers update their transit data). Therefore, the process examines the identified transit routes to assess the rankings (e.g., primary and secondary) of the routes. Some embodiments do not use a primary and secondary ranking system. Some such embodiments use a single level ranking system in which all the information (different criteria, preferences, and incidents data) are gathered at the same time and the highest ranked transit based on the gathered information is displayed.

The process then determines (at 210) whether the route that is selected to be displayed in the route presentation area of the application is the best ranked route or not. When the process determines that a higher ranked route is not selected to be displayed, the process displays (at 215) the incident report of the higher ranked route as the reason for not selecting this route to be displayed to the user. For example, when a major accident delays a first transit route that is shorter than a second transit route that is selected to be displayed, the application shows a report about the accident as the reason for not showing the first route in the route display area. The process then ends.

On the other hand, when the process determines (at 210) that the highest ranked route is selected to be displayed, the process determines (at 220) whether there is any incident that could possibly delay the selected route. That is, the process examines the received traffic data related to the different legs of the selected route to realize whether there is any incident that could affect the traffic along these legs. When the process determines that there is no incident, the process displays (at 225) the arrival time (or estimated arrival time) at the destination in the incident display area. The process then ends.

On the other hand, when the process determines that there is an incident along the displayed route that could delay the route, the process displays (at 230) the incident report in the incident display area. It should be noted that the displayed incident here which has occurred along the displayed route is different than the incident shown at operation 215. That is, the displayed incident here does not delay the route long enough to lower the ranking of the route and cause the route not to be displayed in the route presentation area. After showing the incident along the displayed route, the process ends.

Some embodiments perform variations of the process 200. The specific operations of the process 200 may not be performed in the exact order shown and described. For example, in some embodiments, the same process is responsible for ranking the route and displaying the best route as well as displaying the incident report. In other embodiments, a different process ranks the best route and the above-described process is for displaying the best route as well as the incident report (or arrival time) in the incident display area. Additionally, the process of some embodiments displays the first transit line frequency or alternatively the transit route frequency instead of, or in conjunction with, the arrival time.

In some embodiments the application displays a text in the incident display area that informs the user of a gap (that is more than a threshold distance) between two consecutive transit legs of the transit route. In yet other embodiments, the application displays the first transit line frequency, or the route frequency, along with any of the incident reports or arrival time. Additionally, the specific operations may not be performed in one continuous series of operations, and different specific operations may be performed in different embodiments.

FIG. 3 illustrates the incident display area 190 displaying three different messages, in three different examples 305-315, for three different conditions related to the displayed transit route. The incident display area 190 of the map application of some embodiments describes why the currently displayed route is selected as the best route by the map application when the settings in the predefined set of criteria and the user preferences dictated otherwise. This display area also shows a report about any incident occurred along the currently displayed route. In some embodiments, the incident display area 190 displays the estimated time of arrival at the destination (e.g., the searched location) when (1) there is no specific reason for selecting the currently displayed route as the best route other than the settings in the predefined set of criteria and the user preferences, and (2) there is no incident occurred along the currently displayed route.

In some embodiments, the map application, or a map service that exchange the transit route and other traffic and map data with the map application), receives the live incidents information from a set of servers in real time. In some embodiments, the incidents information includes information about accidents, weather, construction work, etc. that are related to one or more legs of the transit route. The incidents information can be complemented by information received from online user accounts and/or through social media websites in some embodiments. In some embodiments the information received from the different sources are first verified by a set of servers and then used by the map application.

The first example 305 shows the UI 100 in a similar state as in the stage 120 of FIG. 1 with the same starting and destination locations shown on the same map presentation. However, the combination of transit vehicles that the transit route uses in the figure is different. More specifically, the map presentation area 130 in this example shows that the transit route includes five different legs that are depicted by five bus route representations 325-345. Although the representation for each portion of the transit route is similar to the other representations, the representation for each portion is separated from the other representations because each bus in the illustrated example belongs to a different bus line. Each portion of the transit route is connected to the other portion by a walking portion that is presented by walk representations 320.

The first example 305 also shows the route summary display area 193 displaying different representations for different transit vehicles of different lines. As shown, the display area 193 displays a bus of the line 125 that travels along the route presentation 325, a bus of the line 236 that travels along the route presentation 330, a bus of the line 512 that travels along the route presentation 335, and a bus of the line 925 that travels along the route presentation 340. Although the last leg of the transit route (i.e., the bus that travels along the route representation 345) is not shown in this example, as it will be discussed below, a user can scroll (e.g., by swiping) through the display area 193 to view the rest of the information. It is also important to note that since the walking distances between the different transit vehicle stations (the bus stops in this figure) are shorter than a threshold distance, there is no walking representation in between the transit vehicle representations in this display area. The display area 193 also displays that the total travel time is 45 minutes and the total walking distance to reach the destination is 0.6 miles.

The first example 305 further shows that the incident display area 190 displays that the Grand Station is currently closed. Similar to display area 193, the incident display area 190 is scrollable in some embodiments and a user can scroll through this display area to view the rest of the information about the incident. A user, by looking at the incident display area, can quickly realize that although a transit route that includes the Grand Station could be shorter than the currently displayed route, because the Grand station is now closed, the application has selected the second best route as the currently displayed route (even though it has more changes of transit vehicles and more total travel distance and total travel time).

The second example 310 shows that the incident display area 190 displays that an accident is delaying a bus line (e.g., the bus line 125 depicted in the fourth stage of FIG. 1) and therefore a different route is selected and shown in the map presentation area as the best current transit route. As shown in the map presentation area 130, the best identified transit route now includes two different bus legs 355 and 365, a walking leg 360, and a subway leg 370. This is also displayed in the route summary display area 193 which displays a bus representation for the bus of the line 56 that travels the leg 355, a walking person representation for the walking leg 360, a bus representation for the bus of the line 166 that travels the leg 365, and a subway train representation that travels the leg 370 of the transit route (from subway line 166). This display area also shows that the total trip time is now 58 minutes which involves 0.9 miles of walking in total.

The third example 315 shows that the incident display area 190 displays the bus transit authority is currently on a strike and as a result no bus of any line is available to participate in a transit route. Consequently, the best transit route at the moment is the transit route that is drawn over the map presentation in the map presentation area. As shown in the map presentation area 130, the best identified transit route between the same starting location and destination location now includes a walking leg 375 and a subway leg 380. This is also displayed in the route summary display area 193 which displays a walking person representation for the walking leg 375 and a subway train representation that travels the leg 380 of this transit route. The display area 193 in this example also shows that the total trip time is now 1 hour and 45 minutes which involves a total walking distance of 2.2 miles.

The above examples are only three examples of messages that some embodiments of the invention display in the incident display area. One of ordinary skill in the art will realize that there can be many other forms of messages that can be shown by other embodiments. For example, some embodiments display, in the incident display area, a message that warns the user of a gap between two consecutive legs of the transit route. That is, some such embodiments display a message in this display area when the embodiments determine that between a last transit station of a transit leg and the first transit station of the next transit leg there is a gap (e.g., a distance that is more than a threshold) that is not traveled by any transit vehicle of any transit line for which the embodiments have transit data.

Figure 4:
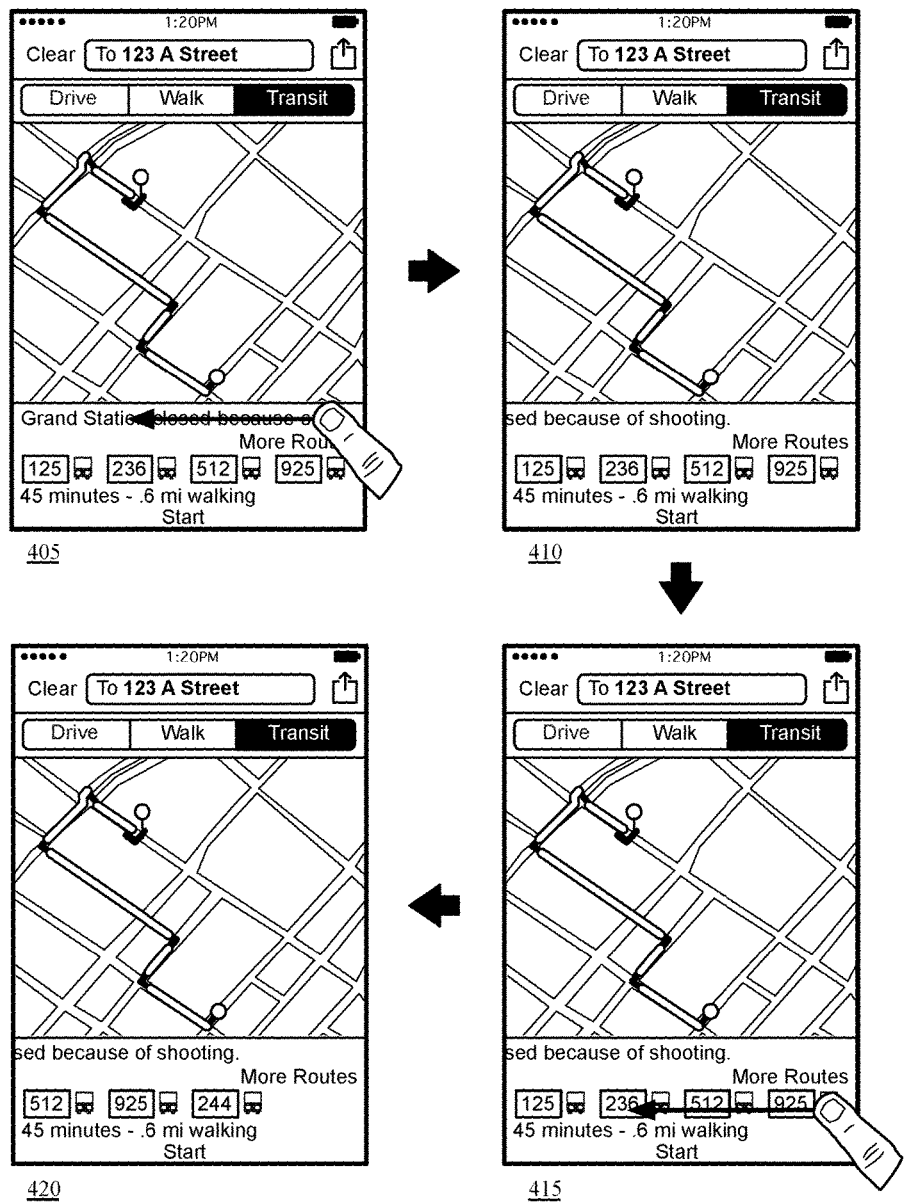
FIG. 4 illustrates how a user can scroll through the different display areas of a map application UI in order to view the whole information provided in these display areas.

FIG. 4 illustrates how a user can scroll through the different display areas of a map application UI in order to view the whole information provided in these display areas. More specifically, this figure shows a user scrolling through the incident display area 190 and the route summary display area 193 in four different stages 405-420. The user scrolls through these display areas to view the rest of the information that does not fit in the display screen of the device In some embodiments a user can swipe through the information by contacting the display area (e.g., touching the display area on the touch-sensitive display screen of the device by user's finger), in which the displayed information is incomplete, and dragging the user's finger to the left for the display area to scroll to the left and appearance of the rest of the content, or alternatively, dragging the finger to the right for the display area to scroll to the right.

The first stage 405 shows the same UI of the map application as in the first stage 305 of FIG. 3, in which the incident display area 190 displayed incomplete information (i.e., "Grand Station closed because of . . . "). At stage 405, however, the user is swiping through the display area to read the rest of the information. That is, the user is swiping the user's finger on the display area to the left in order to scroll the content in from the right and view the rest of the information. The next stage 410 shows that the display area 190 now displays the rest of the information to the user. More specifically, this stage shows that the incident display area displays the remaining portion of the incident report, which states the reason for closure of the Grand Station (i.e., a shooting has occurred at the Grand Station). Some embodiments rather than scrolling through the incident information, use multiple lines to display all the incident information at once.

The third stage 415 shows the same UI of the map application as in the first stage 405. However, at this stage, instead of swiping through the incident display area 190, the user is swiping through the route summary display area 193 to show the rest of the route summary. That is, the user is swiping the user's finger on the display area to the left in order to scroll the content in from the right and view the rest of the information. As described in the previous figure, while five different transit vehicle representations are shown on the map presentation, the route summary display area can only fit in four of the bus representations that cover the first four routes drawn on the map presentation. The next stage 420 shows that the display area 193 now displays the rest of the route summary which includes a bus line representation for the last leg (345) of the trip.

As described above, upon receiving a request for transit navigation mode, the map application of some embodiments identifies one or more transit routes to the specified destination, selects one of the identified transit routes as the best possible transit route based on a set of criteria, and displays the selected transit route. The identification of transit routes and selection of the best route, as described, is performed by a mapping service that provides map and transit data to the map application in some embodiments. To identify the transit routes, the application of some embodiments examines trips that one or more transit vehicles of one or more transit systems make from locations nearby the current device's location to locations near the specified destination. Although the map application identifies and displays the best route among several identified routes, the user of the map application of some embodiments is able to view and select the other identified routes as well. In some embodiments, the user can change the best displayed route with one of the other identified transit routes between the starting location and the destination location.

Figure 5:
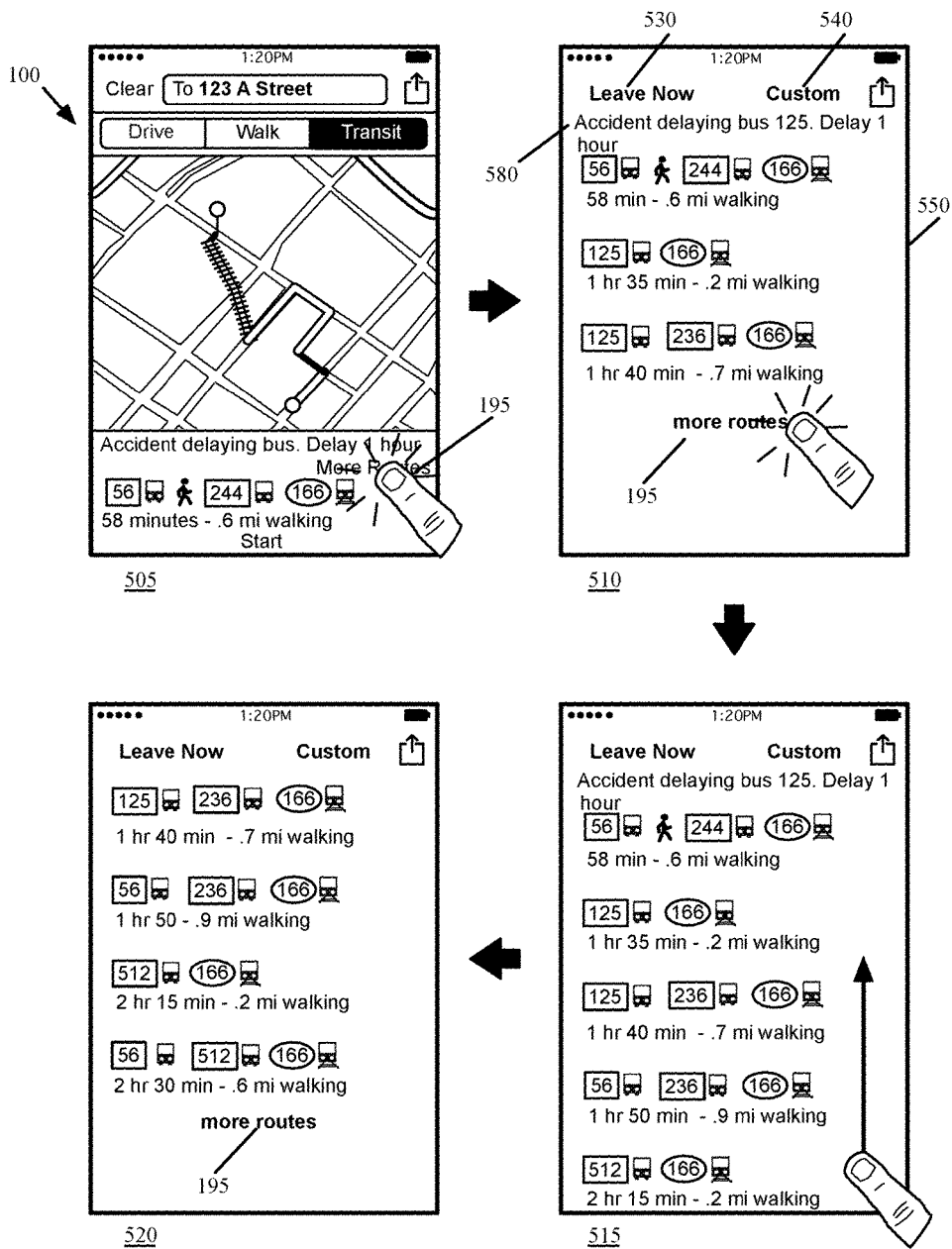
FIG. 5 illustrates a user selecting the More Routes control to view the other identified transit routes between the current location of the device and the destination location.

FIG. 5 illustrates in terms of four operational stages 505-520 of the map application UI 100, a user selecting the More Routes control 195 to view the other identified transit routes between the current location of the device and the destination location. The first stage 505 shows the same map application UI of the second example 310 of FIG. 3 except that in this stage 505, the user is selecting the More Routes control 195 (e.g., by tapping on the UI control 195). This stage shows that the incident display area 190 displays that an accident is delaying a bus line (e.g., the bus line 125 depicted in the fourth stage of FIG. 1) and therefore the currently displayed route is selected as the best transit route at the moment.

The second stage 510 illustrates that selection of the control 195 directs the map application to provide a separate display area 550 in order to display the additional identified transit routes. As described above, the identified available transit routes in some embodiments are ranked based on a set of criteria (e.g., the quickest route, the shortest route, etc.) and the initially displayed route is the highest ranked transit route among the identified routes. In the illustrated example, the criterion of ranking the transit routes is the shortest trip duration. Therefore, in this example, the displayed route is a transit route with trip duration of 58 minutes.

After selection of the control 195, the second stage 510 shows that the more routes display area 550 now displays two additional route summary presentations besides the initially displayed route summary presentation that was displayed in the first stage. This stage also shows that the incident report 580 is shown at the top of the display area and before the route summary presentation. In some embodiments, the incident report shown in the more routes display area is a more complete version of the incident report displayed in the route planning display area (i.e., the route presentation display area 130 of the first stage). As illustrated, the route summary now shows that the accident has occurred in the bus leg (bus line 125) of the second transit route and consequently this transit route, because of the delay, is now the second best route among the identified routes.

The three transit route summary presentations are shown in the more routes display area 550 based on their rankings (i.e., sorted from the shortest trip duration to the longest trip duration). Although not shown, some embodiments display additional information in the display area 550 for each route summary presentation. For example, some embodiments display, in front of route summary presentation, departure time or frequency of departures of the first transit line in the corresponding route summary. Alternatively, or conjunctively, some such embodiments display the departure frequency of the entire route for each route summary. Other embodiments display other information such as an incident report for each route summary (if there is any).

The second stage 510 also shows two more selectable UI controls which are the Leave Now UI control 530 and Custom UI control 540. This stage further shows a More Routes control 195 that is displayed at the end of the current route summary presentations. Selection of the Leave Now UI control 530 in some embodiments directs the map application to (1) change all the customized temporal settings to the current date and time and (2) return to displaying the UI of the map application in the first stage 505. In some other embodiments, selection of the UI control 530 directs the map application to only change all the customized temporal settings to the current date and time. Selection of the Custom UI control 540 directs the map application of some embodiment to provide a custom display area for customizing a set of transit preferences in transit route selection which is described in the filed U.S. patent application Ser. No. 14/869,403, entitled "Map Application with Transit Navigation Mode".

In some embodiments, the map application provides a More Routes UI control 195 in the display area 550 after it shows a specific number of transit routes in this display area (e.g., after each three transit routes). This stage also shows that the user selects the UI control 195 to view even more identified routes. The third stage 515 shows that as a result of selection of the control 195 in the more routes display area 550, two more available route summary presentations with lower rankings (i.e., higher trip duration) are displayed in the display area 550. This stage also shows that the user scrolls the display area up to show additional transit routes that did not fit in the display screen of the device.

The fourth stage 520 shows that the display area is scrolled up and is now displaying all the three new transit route summary presentations. This stage also shows that at the end of the displayed transit routes, the More Routes control 195 is displayed again for viewing the next additional transit routes (if any). This stage also shows that the incident report 580 is not displayed in the more routes display area as a result of scrolling the route summaries. However, in some embodiments, the incident report 580 always stays on top of the more routes display area even after scrolling the transit routes. Some embodiments display three additional routes each time the control 195 is selected. Moreover, although not shown, some embodiments provide additional selectable UI controls for interaction with the displayed route summaries. For example, some embodiments display a Share control next to each route summary presentation for sharing the corresponding route summary with one or more other persons.

Figure 6:
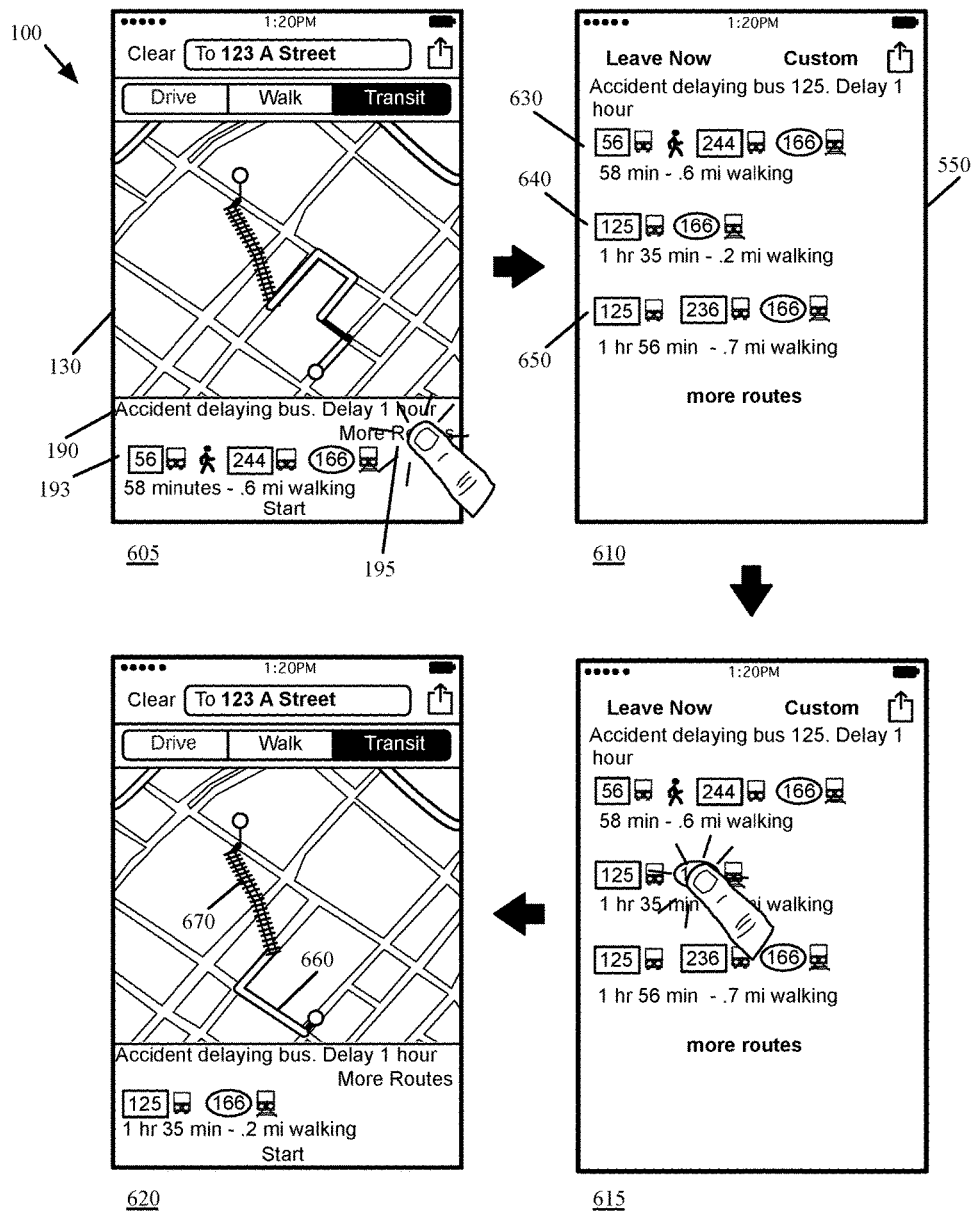
FIG. 6 illustrates an example of replacing a displayed transit route with another identified route between the current location of the device and a destination location.

FIG. 6 illustrates an example of replacing a displayed transit route with another identified route between the current location of the device and a destination location. More specifically, this figure shows, through four operational stages 605-620 of the map application UI 100, a user selecting the More Routes control 195 to view the other identified transit routes between the two locations and selecting one of the other available transit routes to replace the currently selected and displayed transit route.

The first and second stages 605 and 610 are identical to the first and second stages 505-510 of FIG. 5. More specifically, the first and second stages 605 and 610 show that the user selects the More Route control 195 to view the other identified transit routes and upon selection of this control, the map application provides the more routes display area 550 which displays the initially displayed transit route summary presentation 630 along with two additional transit route summary presentations 640 and 650. The three transit routes, as described above, are ranked and sorted based on the total duration of the trip in each transit route. Also the incident report in the display area 550 shows that the second route 640 which could have been the best route is delayed because of an accident and as such it is ranked second now in the list.

The third stage 615 shows that the user selects the transit route summary presentation 640 (e.g., by tapping on the route summary presentation 640) even though the incident report is showing an accident along the bus line 125 of that transit route. As a result, the fourth stage 620 shows that the originally displayed route 630 that was displayed in the map presentation area 130, is now replaced by the selected route 640 which includes a bus route representation 660 and a subway route representation 670. This stage also shows that the information in the route summary display area 193 is updated with the information of the newly selected route. That is, the display area 193 now displays the total trip duration as 1 hour and 35 minutes, which includes 0.2 miles of walking.

In some embodiments, the incidents are characterized as either blocking incidents or non-blocking incidents. Some embodiments categorize an incident as a blocking incident when the incident causes the route, to which the incident is attached, almost unusable. For example when a construction work has caused a portion of a transit route to be shut down, that construction work would be characterized as a blocking incident. Some such embodiments categorize the incident as a blocking incident, when the incident causes the transit leg to which it is attached (i.e., along which it has occurred) unusable for more than a threshold amount of time.

When a blocking incident is attached to a transit leg of a particular transit route, that particular transit route cannot be selected to replace a currently selected and displayed transit route. In other words, when a blocking incident has occurred along a particular identified transit route between two locations, even though the particular route is displayed to the user as one of the identified routes (e.g., in form of a route summary presentation), the route cannot be selected by the user to replace another selected route. For instance, in the above illustrated example, if the accident that caused the delay for bus line 125 was a type of accident that made the bus route unusable for a long time (e.g., more than a threshold period of time) the incident would be characterized as a blocking incident, in which case the user was not able to select the route in the third stage even though its corresponding route summary presentation was among the other identified route summaries.

Conversely, when a non-blocking incident is attached to a transit route (i.e., to a transit leg of the transit route) the transit route is still selectable and can replace the currently selected and displayed transit route. In the illustrated example, the accident along the bus route is a non-blocking incident and as such the user was able to select it to replace the originally selected transit route.

Lastly, the incident display area 190 is not updated because in the first stage, this display area was showing the same incident report as the reason for not displaying the route 640 as the best route in the first stage 605. In other words, in the first stage, the incident report showed the accident along the bus line 125 to indicate the reason for not choosing the transit route that included this bus line as one of its transit legs, while in the fourth stage, the incident report shows the same accident along the bus line 125 to indicate that the currently displayed route is delayed because of this accident.

Figure 7:
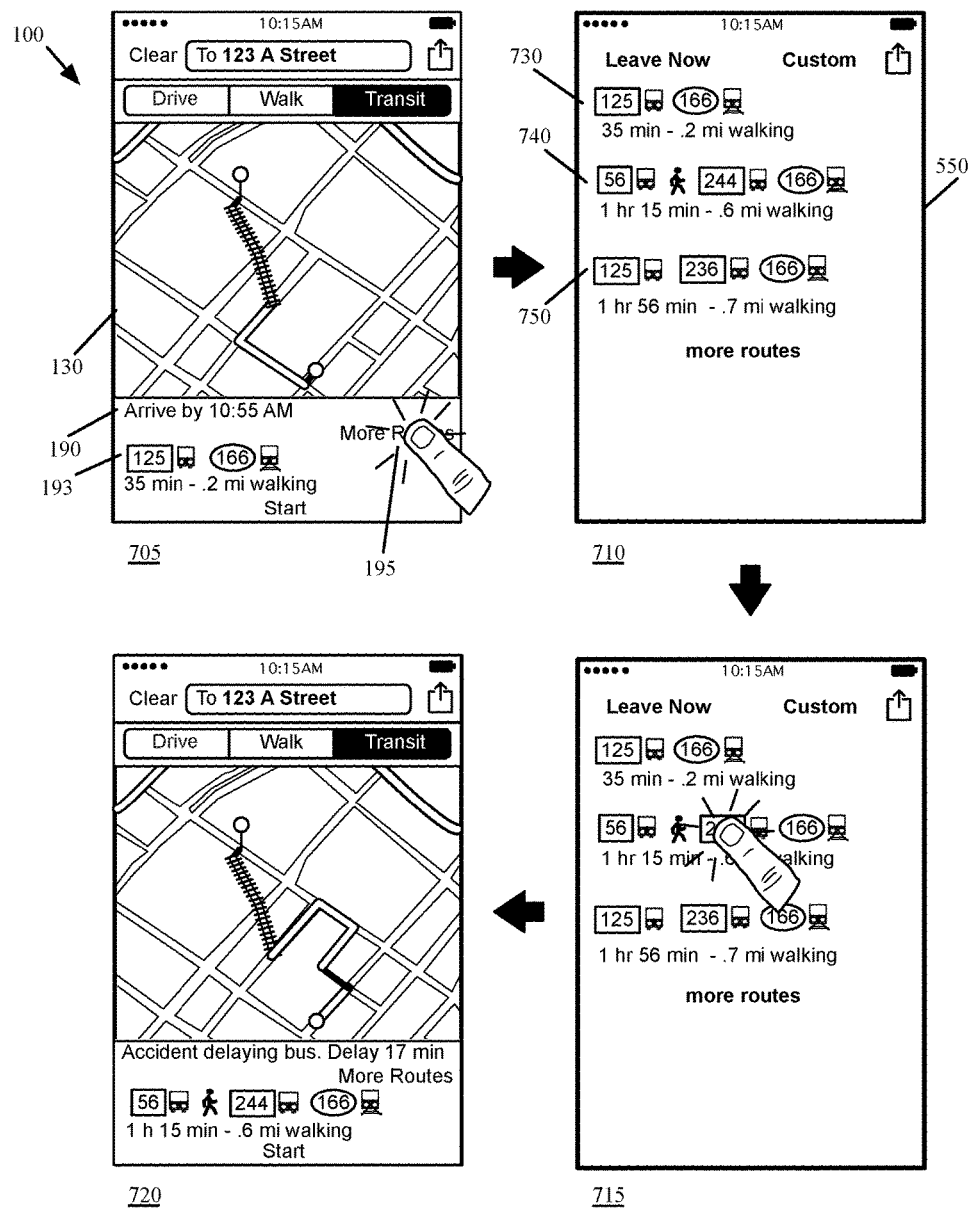
FIG. 7 illustrates another example of replacing a displayed transit route with a second different route between the current location of the device and a destination location.

FIG. 7 illustrates another example of replacing a displayed transit route with a second different route between the current location of the device and a destination location. Specifically, this figure shows, through four operational stages 705-720 of the map application UI 100, a user selecting the More Routes control 195 to view the other identified transit routes between the two locations and selecting one of the other available transit routes to replace the currently selected and displayed transit route. The originally selected and displayed transit route does not include any incident (e.g., accident, road work, etc.) along any one of its transit legs, while the newly selected route (from the additional routes display area) includes an accident along one of its transit legs.

The first stage 705 shows a similar UI of the map application to the UI 100 shown in the fourth stage 620 of FIG. 6. However, the displayed UI in this stage is displaying the transit route at a different time. Specifically, in the previous example, because of an accident along the displayed transit route 640 around 1:20 in the afternoon, the route had not been originally selected to be displayed and instead route 630 was shown as the best selected route in the first stage of FIG. 6. In the first stage 705 of FIG. 7 though, the time is 10:15 in the morning and since there is no accident along the originally best identified route (i.e., route 730), this transit route is shown to the user in the map presentation display area 130. Additionally, the incident display area 190 shows the arrival time at the destination (10:55 AM) and the route summary display area shows a representation of transit lines that are used for this route. The first stage of this figure also shows that the user selects the More Route UI control 195 to view the other identified transit routes.

The second stage 710 shows that, upon selection of the UI control 195, the map application provides the additional routes display area 550 which displays the initially displayed transit route summary presentation 730 along with two additional transit route summary presentations 740 and 750. The three transit routes, as described above, are ranked and sorted based on the total duration of the trip in each transit route. That is, the route summary presentation 740 with a total trip duration of 1 hour and fifteen minutes is ranked and displayed as the second available transit route after the route summary presentation 730, and the route summary presentation 750 with a total trip duration of 1 hour and fifty six minutes is ranked and displayed as the third and last available route in the more route display area 550.

The second stage 710 additionally shows that there is an incident (i.e., an accident that delays bus line 244) along one of the transit legs of this route for which an incident report 770 is displayed under the route summary presentation 740. That is, some embodiments (as in the previous example) show the incident report at the top of additional routes display area 550, while other embodiments (as in the example of this figure) display each incident related to a particular transit route, under the route summary presentation of that particular route. In some embodiments, the incident report displayed under the route summary is selectable, and when the user selects the displayed incident (e.g., by tapping on the incident), the application opens a new display area that displays a detailed report about the selected incident. The new detailed incident display area partially covers the additional routes display area in some embodiments. In some other embodiments, the full incident display area replaces the more routes display area.

The third stage 715 shows that the user selects the transit route summary presentation 740 (e.g., by tapping on the route summary presentation 740), even though this transit route is not the fastest transit route at the moment. As a result, the fourth stage 720 shows that the originally displayed route 730 that was displayed in the map presentation area 130, is now replaced by the selected route 740, which includes two bus route representations and one subway route representation for the bus legs and subway leg of the transit trip respectively. This stage further shows that the information in the route summary display area 193 is updated with the information of the newly selected route. That is, the display area 193 now displays the total trip duration as 1 hour and 35 minutes, which includes 0.6 miles of walking.

Additionally the incident display area 190 at the fourth stage 720 displays an incident report instead of the originally shown arrival time at the destination. This is because the map application (or a corresponding map service application that provides all the map and incident data to the map application) has received the incident data (e.g., from the a set of dedicated servers that provide incident information along the different transit routes) for this route which indicates that there is an accident along a bus line (i.e., bus line 244) which has resulted in a delay in the total trip time for this transit route. This stage also shows that a geometric shape (e.g., a triangle that resembles a traffic sign) 760 is displayed next to the incident report in the incident report display area 190, as well as on top of the bus line 244 representation (that partially covers the bus line representation) in the route summary presentation area 193. Some embodiments display this geometric shape on the transit vehicle representation in the route summary presentation (an other places) to draw the user's attention to the existence of an incident along the selected and displayed transit route.

In some embodiments, a mapping service provides the incident reports (data) to the map application. In some embodiments the mapping service is the same mapping service that provides the different mapping data (e.g., road data, traffic data, etc.) and routing data to the map application. The mapping service of some embodiments uses an incident curator module that gathers all the incident data from different sources (e.g., dedicated servers, social media, individual users, etc.) and stores the received data along with several other modules to generate different transit routes to be used by the map application.

Figure 8:
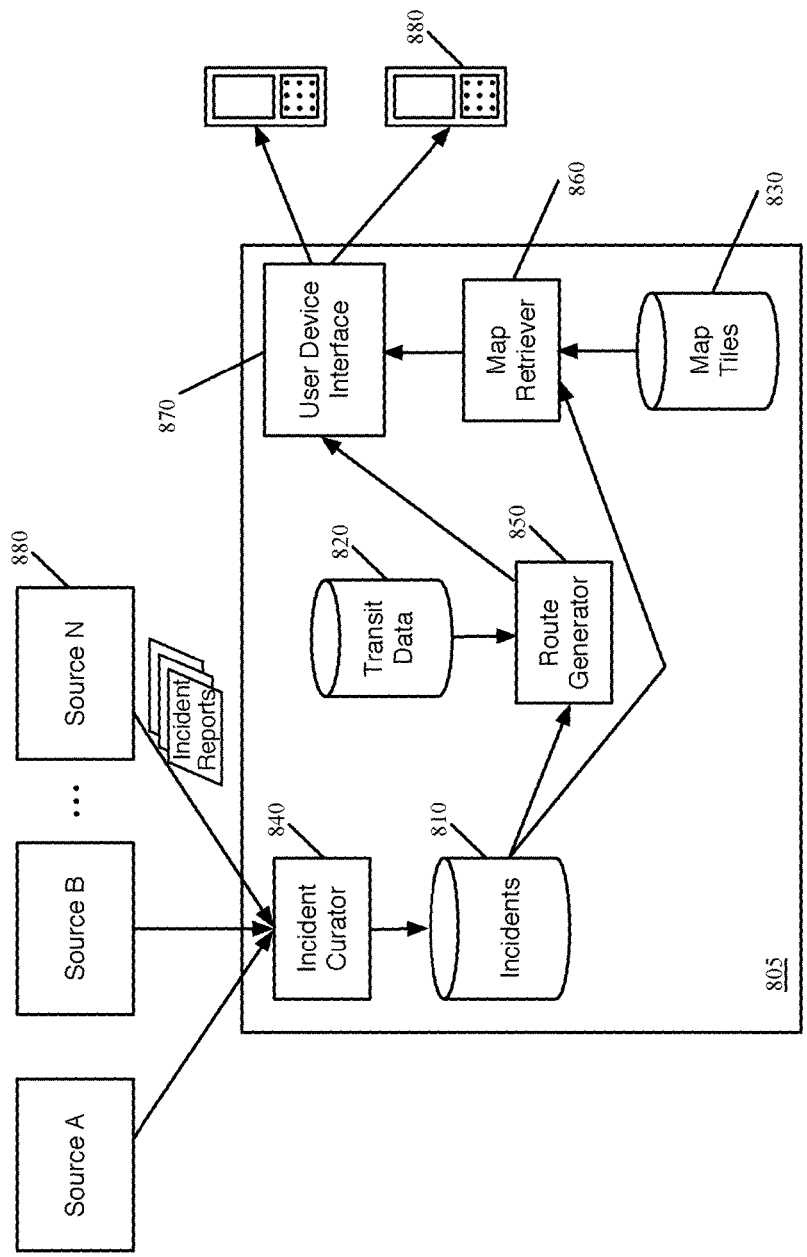
FIG. 8 conceptually illustrates a mapping service that gathers different incident data (e.g., through an incident curator and incidents storage) and uses this data in order to generate transit routes.

FIG. 8 conceptually illustrates a mapping service 805 that gathers different incident data (e.g., through an incident curator and incidents storage) and uses this data in order to generate incident reports and transit routes. The mapping service 805 includes an incidents storage 810, a transit data storage 820, a map tiles storage 830, an incident curator 840, a route generator 850, a map retriever 860, and a user device interface 870. One of ordinary skill in the art would realize that each of the illustrated modules may include various different sub-modules that each performs a different function for the module. Similarly, each storage shown in this example may include several different storages that each stores a different category and/or type of mapping and routing data. The illustrated modules and storages are exemplary and can be different in different embodiments.

The incident curator 840 receives different real time incident data for different transit lines and/or stations of an area from different sources 880. In some embodiments, the incident data includes information about accidents, weather, construction work, etc. that can affect the transit lines and/or stations of an area. The different sources 880 of incident data in some embodiments may include one or more dedicated servers that store the incident data, social media networks (e.g., Facebook, Twitter, etc.), individual users who are authorized to generate and provide such data, national and/or local weather services, or other types of private and/or public networks. The incident curator 840 of some embodiments then stores the received incident data in an incidents storage 810.

In some embodiments the curator 840 first organizes the received data into different categories and then stores the categorized information in the storage 840. The data structure of the incidents storage 810 is further described below by reference to FIG. 9. Additionally, in some embodiments the incident curator 840 continually or periodically checks for new incident data from different sources and stores and/or updates the received data in the incidents storage 810. In some embodiments, the curator 840 purges the incidents storage 810 periodically in order to ensure that the incident data stored in the storage is the latest updated incident data.

When the mapping service receives a request for transit routes between two particular locations (e.g., from a map application), the route generator 850 tries to identify one or more transit routes between the two locations based on the transit route data stored in the transit data storage 820. When the route generator identifies a set of transit routes that can be used between the two locations, the route generator 850 checks the incidents storage 810 for any potential incidents that relate to the set of identified routes. That is, the route generator checks for any related incident that may affect one or more legs of the identified set of transit routes.

The route generator 850 of some embodiments then uses the incident data to rank the identified routes in set of transit routes and send them to the user device interface 870 to be sent to the requestor (e.g., the map application that requested for the transit routes). In some other embodiments, the route generator 850 sends the identified set of routes along with the related incident data to the map application that requested the routes (through the user device interface) and the map application ranks the routes based on the incident data it has received. As described above, in some embodiments, the transit routes are further ranked (e.g., by the map application or the route generator 850) based on a particular set of criteria (e.g., fastest route, shortest route, etc.). In some such embodiments, the combination of the set of criteria and the incidents determine the ranking of the different transit routes.

The user device interface 870 of some embodiments receives the identified set of transit routes from the route generator 850 and the map retriever 860 and sends these information to the user devices 890 to be used by different applications running on these devices such as the map applications. The map retriever 860 of some embodiments, upon receiving a request for a map (e.g., a transit map) of a region, retrieves the related map tiles for that region from the map tiles storage 830 and sends the retrieved map tiles to the requestor through the user device interface 870.

In some embodiments, the map retriever, after retrieving the related map tiles, checks the incidents storage 810 for any potential incidents related to the retrieved map tiles of the map region. The map retriever of some such embodiments then sends the map tiles along with the incident data to the requestor (e.g., a map application). Requesting for transit maps and displaying different transit maps of different regions along with incident reports are further described in the U.S. patent application Ser. No. 14/545,680, entitled "Display of Transit Features in Mapping Application", filed Jun. 6, 2015, which is incorporated herein by reference.

One of ordinary skill in the art will recognize that the above-described data storages are merely representative of the manners in which the different modules of the mapping service could retrieve the needed data (e.g., incident data, map tiles, etc.). In some embodiments, the map application that runs on a device 890 first checks a cache, and if the data that the application needs is not found in the cache then sends a request to the mapping service for the needed data (i.e., tiles, routes, incidents, etc.).

Figure 9:
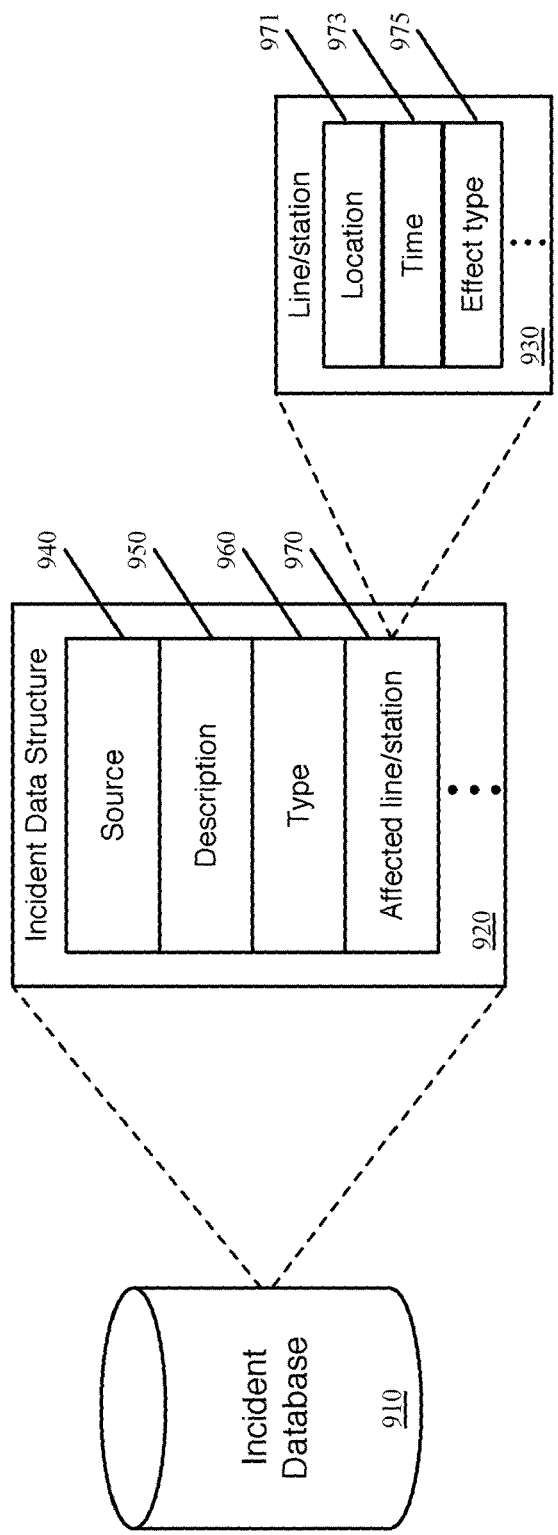
FIG. 9 conceptually illustrates a data structure (e.g., a table, a data source, etc.) of the incident database storage that is described in FIG. 8.

FIG. 9 conceptually illustrates a data structure (e.g., a table, a data source, etc.) of the incident database storage that is described above by reference to FIG. 8. As described above, the database storage 910 stores different types of incident data that can affect different transit lines and/or stations located in a particular area (e.g., a city, a county, etc.). The data structure of the stored data in some embodiments is displayed as the incident data structure 920 in this figure. The incident data structure of some embodiments, as illustrated in the figure, includes a source 940 of the incident, a description 950 of the incident, a type 960 of the incident, and the affected lines and/or stations 970 by the incident. The displayed structure is exemplary and the incident data structure of different embodiments may include different numbers of other fields. Additionally, each one of the fields shown in the incident data structure 920 may relate to one or more other fields of a different data structure (e.g., a table, a data source, etc.).

For example, the affected lines/stations field 970 of the incident data structure 920 of some embodiments may be associated with a location 971, a time 973, and a type of effect 975. In some embodiments, the source 940 of an incident identifies from what source the incident curator has received the incident and stored it in the incidents storage 910. For instance a source of an incident can be a social media, a weather service, an incident server, an authorized individual, etc. The description 950 of an incident, in some embodiments, specifies how the incident will be shown by the map application. For instance, the description could be a text line that describes an accident along a specific line (e.g., "an accident delays the bus line X," etc.), a public announce of a road closure, a construction work announcement, etc.

The type 960 of an incident as its name suggests specifies the type of incident (e.g., construction, accident, inclement weather, etc.) in some embodiments, and the affected lines/stations 970 specifies one or more transit lines and/or transit stations that are affected by the incident. Each line and/or station can be further categorized with the location of the incident, the time at which the incident has occurred, the type of effect that the incident has caused, etc. For example when there is an accident along a transit line, the location 971 shows the exact location of the accident along the transit line, the time 973 identifies the delay time that the accident may cause, and the effect type 971 specifies what type of delay the accident has caused for the transit line (e.g., closure, slowing down, etc.).

Figure 10:
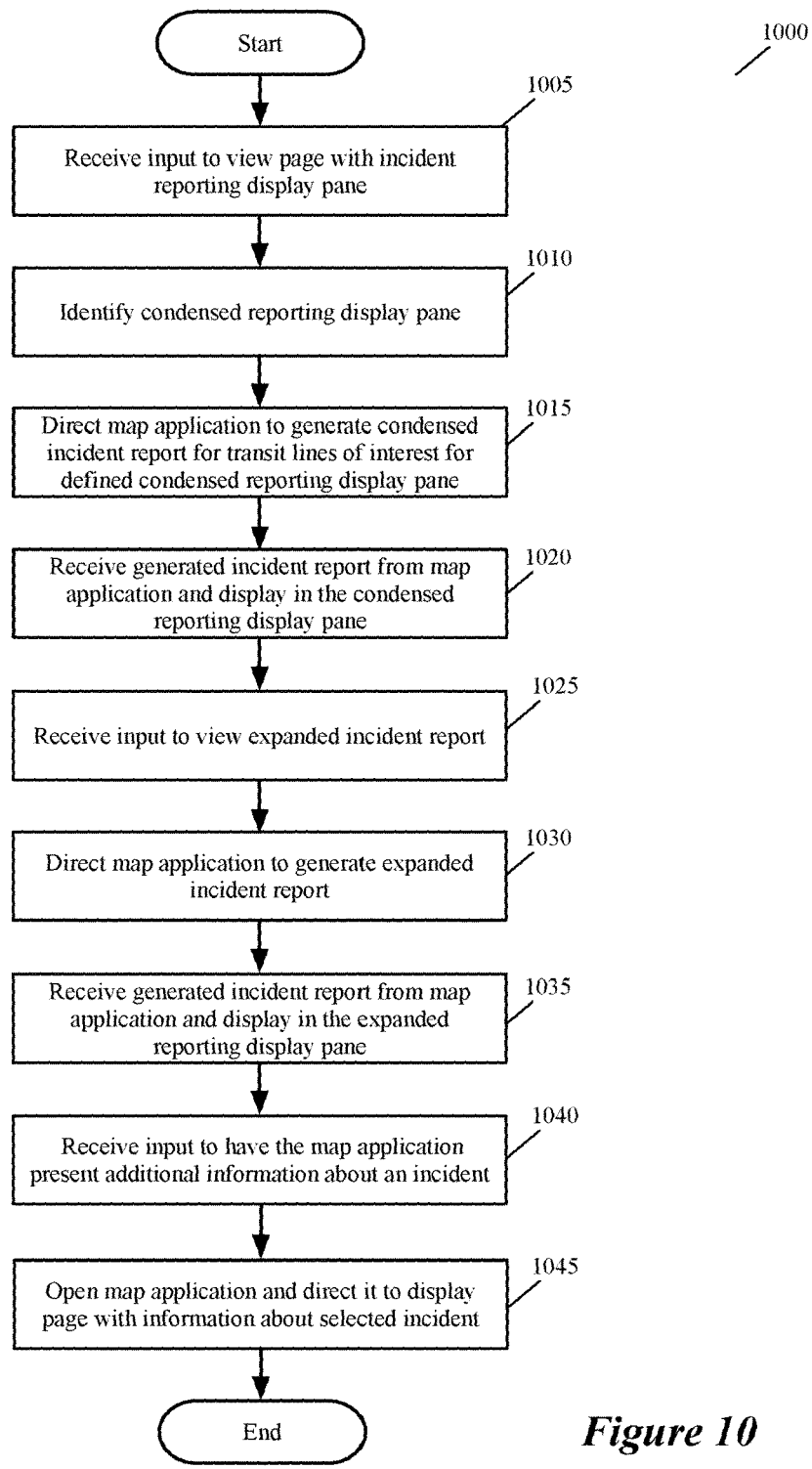
FIG. 10 conceptually illustrates a process that the mobile device operating system (OS) of some embodiments performs to provide the transit line incident reports.

The operating system of the mobile device of some embodiments provides transit line incident reports in an interface that a user can easily access without first opening the map application, which generates the incident reports. FIG. 10 conceptually illustrates a process 1000 that the mobile device OS of some embodiments performs to provide the transit line incident reports. A notification manager of the OS performs this process in some embodiment. This process will be described by reference to FIGS. 11-18, which illustrate examples of a user's interactions with the OS and the map application and of the types of incident reports displayed on the mobile device of some embodiments.

As shown in FIG. 10, the process 1000 starts when it receives input to present a page that displays a transit incident reporting display pane. In some embodiments, the incident reporting display pane is a display area (e.g., a window) in which the device provides transit incident reports. In some embodiments, an operating system (OS) of the device provides an affordance to view the transit incident reporting pane without opening of the map application.

Figure 11:
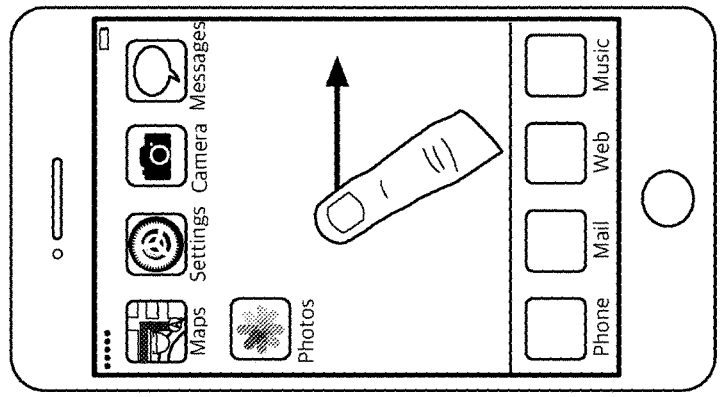
FIG. 11 illustrates an example of an affordance that is accessible through a displayed page that the device OS generates and displays on the device's display screen.

FIG. 11 illustrates an example of such an affordance that is accessible through a displayed page that the device OS generates and displays on the device's display screen. In this example, the displayed page is the home page of the mobile device, and the affordance is a left swipe on the touch-sensitive display screen of the mobile device. This swipe on the home page directs the operating system to present a page on which one or more notification panes are being displayed. In some embodiments, some or all of these notification panes are associated with applications executing on the mobile device, and present information obtained from these applications. As further described below, one of these notification panes is the transit incident notification pane that provides information regarding incidents associated with transit lines of interest.

Figure 13:
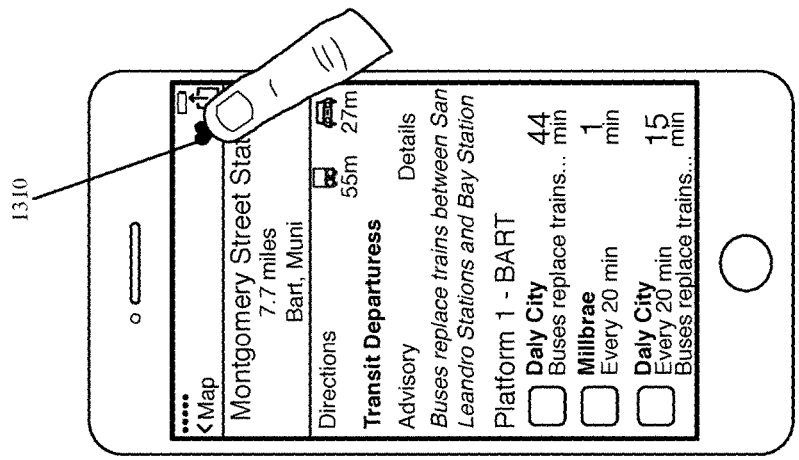
FIG. 13 illustrates that the user selecting a favorite icon that is presented on a station's information card in order to add this station to the favorites list and thereby designate it as a station of interest.
Figure 12:
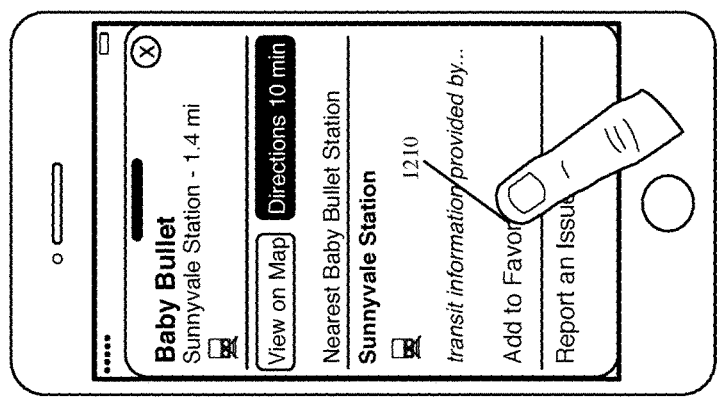
FIG. 12 illustrates how a map application of some embodiments allows a user to identify a transit line of interest.

In response to the selection of the OS affordance (at 1005), the process 1000 identifies (at 1010) a condensed version of the transit incident reporting pane, and directs (at 1015) the map application to generate, for this condensed pane, a display that reports any incident associated with any transit line of interest. In some embodiments, the map application identifies a transit line to be of interest when it has been designated as such by a user of the device. The map application of some embodiments allows a user to identify a transit line to be of interest by selecting the transit line on the map, viewing the transit line's information card, and selecting the "Add to Favorites" icon 1210 to add the transit to the list of favorites that is maintained by the map application, as shown in FIG. 12. In some embodiments, the map application also allows the user to designate a transit station to be of interest through the station's information card. FIG. 13 illustrates that the user selecting the favorite icon 1310 that is presented on a station's information card in order to add this station to the favorites list and thereby designate it as a station of interest.

Conjunctively, or alternatively, the map application of some embodiments identifies transit lines that are repeatedly used by the device (e.g., to navigate routes) to be transit lines of interest. For instance, in some embodiments, the map application counts the number of times in which it provided navigation instructions or navigation presentations for a route that used a transit line. When the number of times exceeds a particular threshold, or exceeds this threshold during a particular temporal duration (e.g., in the three months), the map application of some embodiments identifies the transit line to be of interest to the user.

After directing (at 1015) the map application to identify incidents associated with any transit line of interest, the process receives (at 1020) from the map application a set of incidents for each transit line of interest. In some embodiments, the set of incidents for a transit line of interest includes incidents along transit stations used by the transit line. At 1020, the process 1000 in some embodiments (1) receives the transit incidents report that the map application generated for the condensed pane specified by the process, and (2) displays the generated transit incidents report in the condensed incident reporting pane.

FIGS. 14-17 illustrate four different examples of transit incident reports that the map application can generate and display in the condensed incident reporting pane 1400. In each of these examples, the condensed incident report pane 1400 has a "Transit" header and a logo of the map application to indicate that it is providing information about transit lines from the map application. When the map application cannot identify any transit line of interest, the map application in some embodiments generates a transit report 1405 of FIG. 14 that specifies that the user has not identified any transit line to be of interest (e.g., has not identified any transit line to be in the user's favorites). This report also directs the user to find transit lines of interest in the maps application and add them to the user's list of favorites so that the device can provide updates and service advisories for these transit lines in the condensed and expanded transit incident reporting panes.

Figure 15:
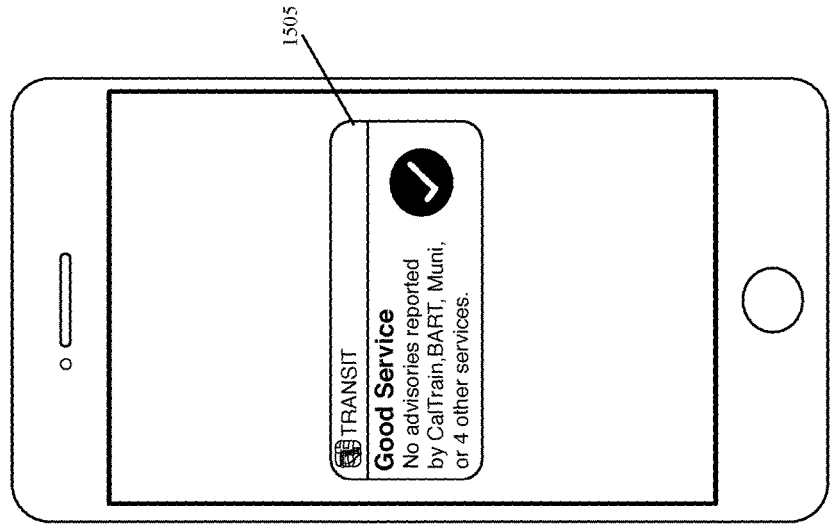
Figure 14:
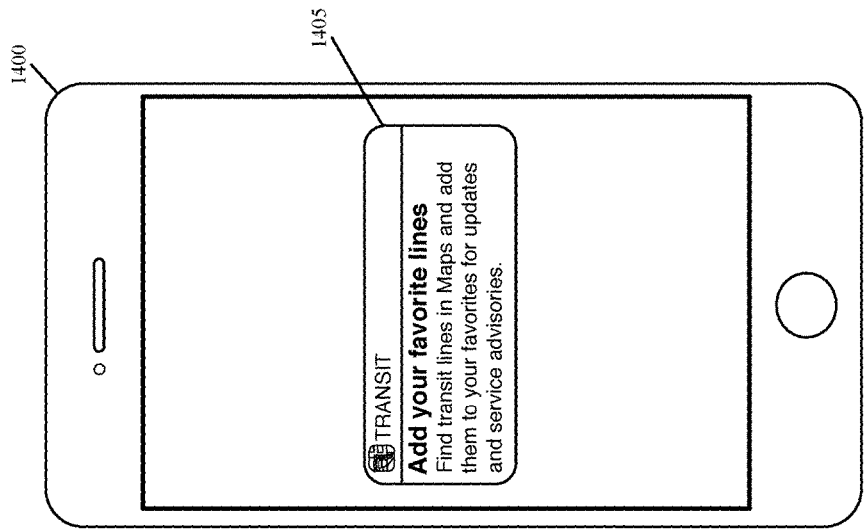

On the other hand, when the map application identifies one or more transit lines of interest, but there are no incidents to report for any of the transit lines, the map application generates a transit report 1505 of FIG. 15. As shown, this report 1505 provides a notice in the condensed incident reporting display area that there is no incident associated with any transit line of interest. This notice is accompanied by a list of the transit lines of interest. In this example, three of the transit lines of interest (CalTrain, BART and Muni) are listed out, while another three transit lines of interest are referred to generically. Also, this notice has a checkmark icon to indicate that currently there are no issues with any of the transit lines of interest.

When at least one transit line of interest has an associated incident, the condensed incident reporting pane 1400 provides a notice that identifies at least one incident associated with at least one transit line. In some embodiments, such notices report service changes, skipped stations, delays, and other advisories. When providing notice of at least one incident, the condensed incident reporting pane 1400 also provides an affordance (UI item) 1625 for replacing the condensed incident reporting pane 1400 with an expanded incident reporting pane 1800, which will be further described below.

FIG. 16 illustrates an example of this pane 1400 providing a notice 1605 that the map application generates for a set of one or more incidents along just one transit line of interest. As shown, this notice has a header 1610 that identifies the type of incident (in this case a Service Change), a transit-line identifying icon 1615 (in this train Q) to identify the affected transit line, and a descriptive text 1620 to describe the incident. In this case, the descriptive text states that "No Q train between 57 St-7 Av and Dimtras Blvd. N trains provide alternative . . . ."

FIG. 17 illustrates an example of the condensed incident reporting pane 1400 providing a notice 1705 that the map application generates for incidents along more than one transit line of interest. As shown, this notice has a header 1710 that identifies the number of transit lines that have associated incidents (in this case "5 Advisories" are reported for five transit lines), and a transit-line identifying icon 1715 for each affected transit line (in this case, identifying trains Q, N, D, 6 and 2). In some embodiments, the transit line icons 1615 and 1715 have the same appearance as the signs for these lines in the transit stations traversed by these lines and in the literature of the operators of these transit lines. These icons match the associated transit line signage in the real world so that the user can quickly identify the affected transit lines from their signs.

The condensed incident reporting pane 1400 might not provide sufficient information about the incidents along the transit line or lines of interest. This might especially be the case when the map application identifies incidents for more than one transit line of interest. Accordingly, the user can employ the control 1625 that is provided in the condensed incident reporting pane when this pane is reporting an incident, in order to expand this pane from its condensed version into its expanded version. When the user uses the control 1625, the process 1000 receives (at 1025) the request for the expanded view, and directs (at 1030) the map application to generate an expanded incident report for display in the expanded incident reporting pane 1800. In some embodiments, the process 1000 provides the dimensions of the expanded pane 1800 to the map application and directs the map application to generate a report that fits within these dimensions.

Figures 18, 19:
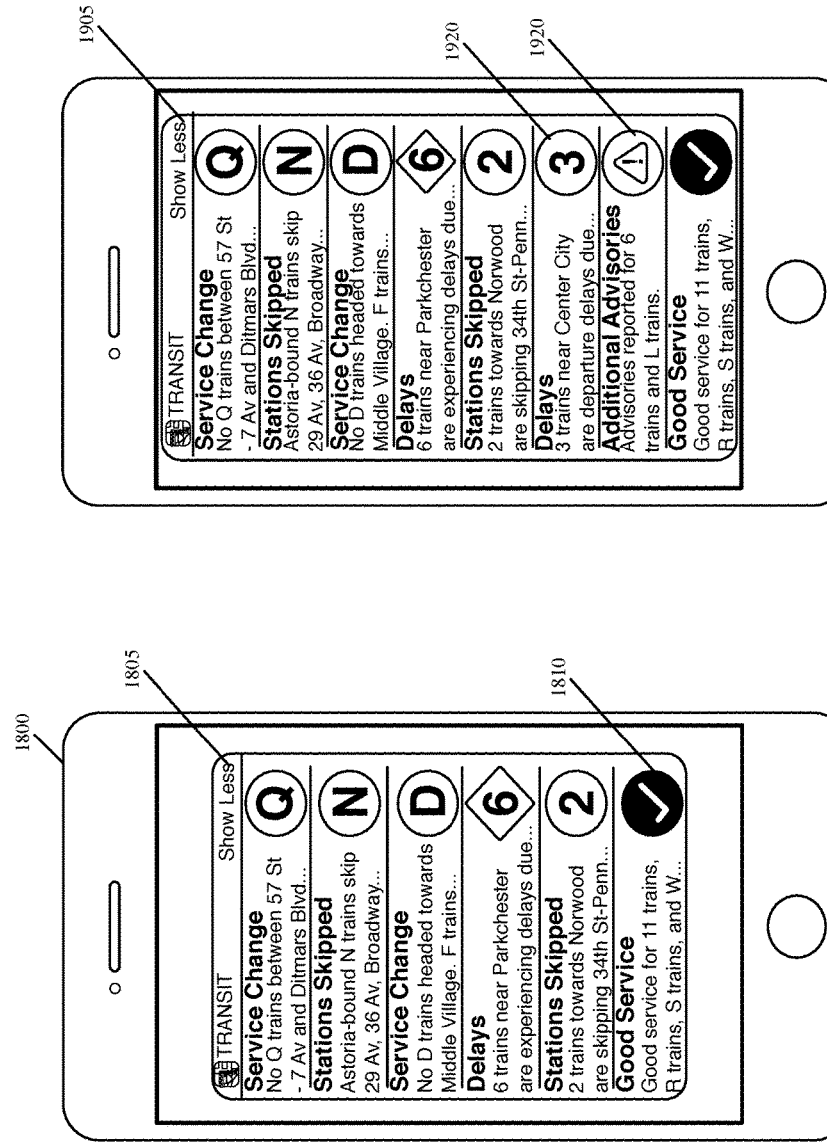
FIG. 18 illustrates one example of an expanded incident report that is displayed in the incident reporting pane.
FIG. 19 illustrates another example of an expanded incident report that is displayed in the incident reporting pane.

At 1035, the process 1000 receives the generated incident report from the map application, and displays this report in the expanded incident reporting pane 1800. FIG. 18 illustrates one example of an expanded incident report 1805 that is displayed in the incident reporting pane 1800. As shown, this report provides more information about each of the transit incidents Q, N, D, 6 and 2, which were previously illustrated in the condensed reporting pane of FIG. 17. This report specifies a service change for line Q ("No Q trains between 57 St.-7 Av and Ditmars Blvd. N trains provide alternate . . . "), a service change for line D ("No D trains headed towards Middle Village. F trains provide alternate route."), and skipped stations for line N ("Astoria-bound N trains skip 29 Av, 36 Av, Broadway and 30 Av.).

This report also identifies 6 delays ("6 trains near Parkchester are experiencing delays due to police inves . . . "), and 2 skipped stations ("2 trains towards Norwood are skipping $34^{th}$ St.-Penn Station"). The report also indicates that there are no incidents on four other transit lines of interest, which are trains on lines 11, R, S and W. As shown, all of these "no incident" lines are summarized in one section 1810 of the expanded incident report 1805.

The number of transit lines with associated incidents can exceed the size of the expanded incident reporting pane 1800. As such, this pane 1800 is a scrollable display area in some embodiments so that the user can scroll through the entire report to see all the reported incidents. Alternatively, in other embodiments, the pane 1800 is not a scrollable display area. As such, the map application needs to generate an incident report that fits in its entirety in the pane 1800. To do this, the map application summarizes the incidents on several transit lines in one section of the report.

FIG. 19 illustrates another example of an expanded incident report 1905 that is displayed in the incident reporting pane 1800. This incident report 1905 has many of the incident report entries listed in incident report 1805 of FIG. 18. It also has several additional incident report entries 1920 and 1925 that are not in the incident report 1805, and each of these additional entries provides a summary of several incidents. Incident report entry 1920 specifies under a heading "Delays" that several trains at a particular location are experiencing delays ("3 trains near City Center are experiencing departure delays due to s . . . "), while incident report entry 1925 specifies under a heading "Additional Advisories" that advisories are reported for several other trains ("Advisories reported for 6 trains, 7 trains, and L trains").

At 1040, the process 1000 receives an input to have the map application present additional information about an incident that is reported in the expanded incident reporting pane 1800. In some embodiments, this input is received when the user selects an affordance associated with an incident entry in the expanded incident reporting display area 1800, e.g., touch selects one of the incidents displayed on the condensed list or expanded list.

In response to this input, the process 1000 directs (at 1045) the map application to present a display pane to provide additional information about a selected transit incident or about all the reported transit incidents. When the map application is not open at 1045, the process directs (at 1045) the map application to open so that it can present the requested transit incident information. When the map application is open, it generates a display area to display one or more display panes (e.g., to display a map, information cards for items on the map, etc.). When the map application operates in the foreground, this display area in some embodiments is displayed on the device's display screen. On the other hand, when the map application operates in the background, its display area in some embodiments is minimized or is covered by display areas of other applications executing on the device. In some embodiments, the map application does not have any display area open in the foreground or background when it is not open. Even when the map application is not open, the process 1000 can interact with the background services that the map application provides, in order to obtain the transit incident reports through communications at 1015, 1020, 1030, and 1035.

Figure 20:
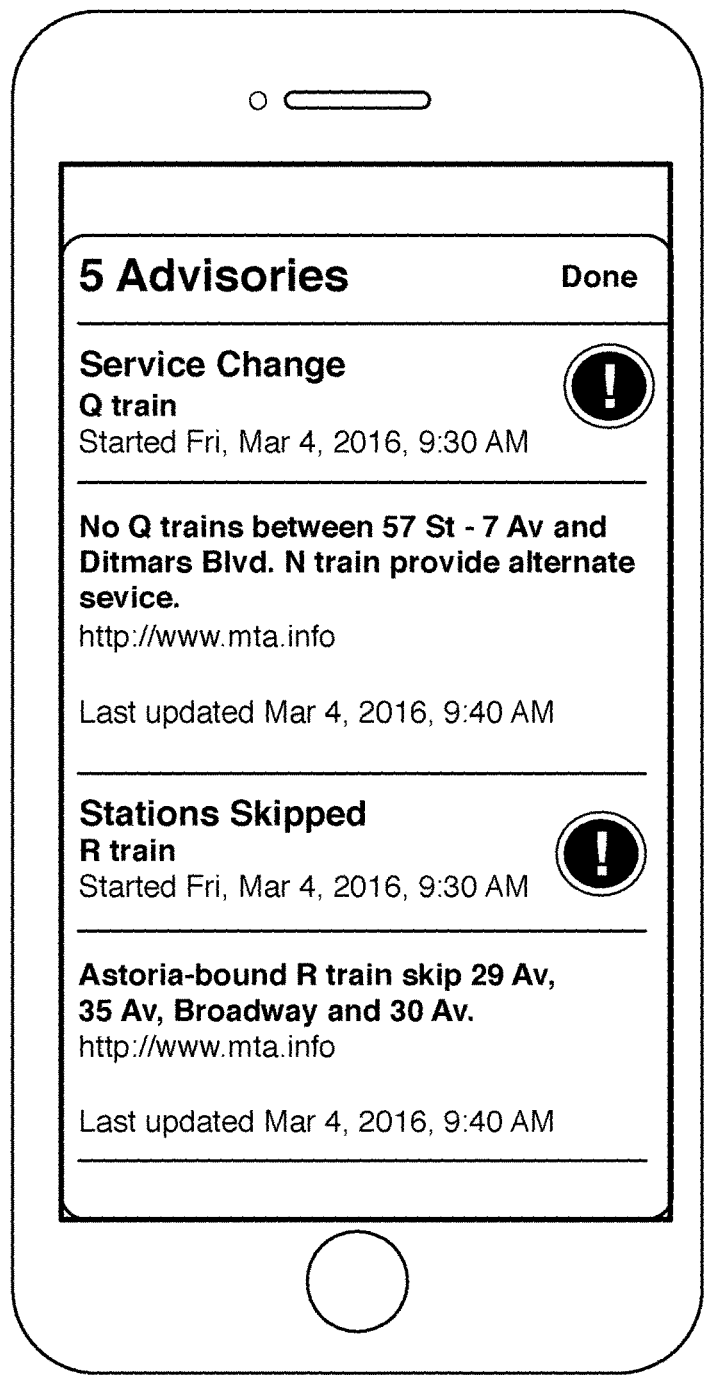
FIG. 20 illustrates an example of a transit incident card that the map application shows when any entry in the expanded incident report is selected.

FIG. 20 illustrates an example of a transit incident card that the map application shows when any entry in the expanded incident report 1905 is selected. This transit incident card displays additional information about each of the incidents in the report 1905. This card is scrollable so that the card can display the incident reports more fully and the user can scroll through these reports, which might extend individually or collectively past the display area that is presented on the screen.

In other embodiments, the map application uses different techniques to present the additional incident information when it is prompted to do so at 1045. For instance, in some embodiments, the process 1000 can direct the map application to provide additional information for individual transit incidents that are reported in the expanded incident reporting pane 1800. In some such embodiments, the map application presents a transit card that reports the set of incidents associated with the transit line(s) or station(s) that are related to the transit incident report that is selected in the pane 1800. Also, in some embodiments, this display pane is displayed over a map that contains the transit line. In other embodiments, selection of an incident in the incident reporting display area directs the map application to display the location of the incident on a map, and to provide the additional incident report with graph and text indicators on the displayed map location.

The process 1000 ends after 1045. One of ordinary skill will realize that this process is a conceptual illustration of one possible sequence of interactions with the notification manager of some embodiments of the invention. A user might interact with the notification manager through other interaction sequences. Also, in the example above, the user has the notification manager open the map application to present additional transit incident information from the expanded incident reporting pane 1800. In some embodiments, the user can direct the notification manager to have the map application present the additional transit incident information from the collapsed incident reporting pane, e.g., by selecting the condensed transit incident report or by selecting a transit line icon displayed in the condensed transit incident report.

The process 1000 has the map application identify transit lines of interest, and then identify incidents along these transit lines or at stations along these transit lines. As described above, the notification manager in other embodiments has the map application (1) identify both transit lines and transit stations of interest, and (2) report incidents along both transit lines and transit stations of interest. In still other embodiments, the notification manager has the map application identify transit stations of interest, and then identify incidents along these transit stations of interest.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 21:
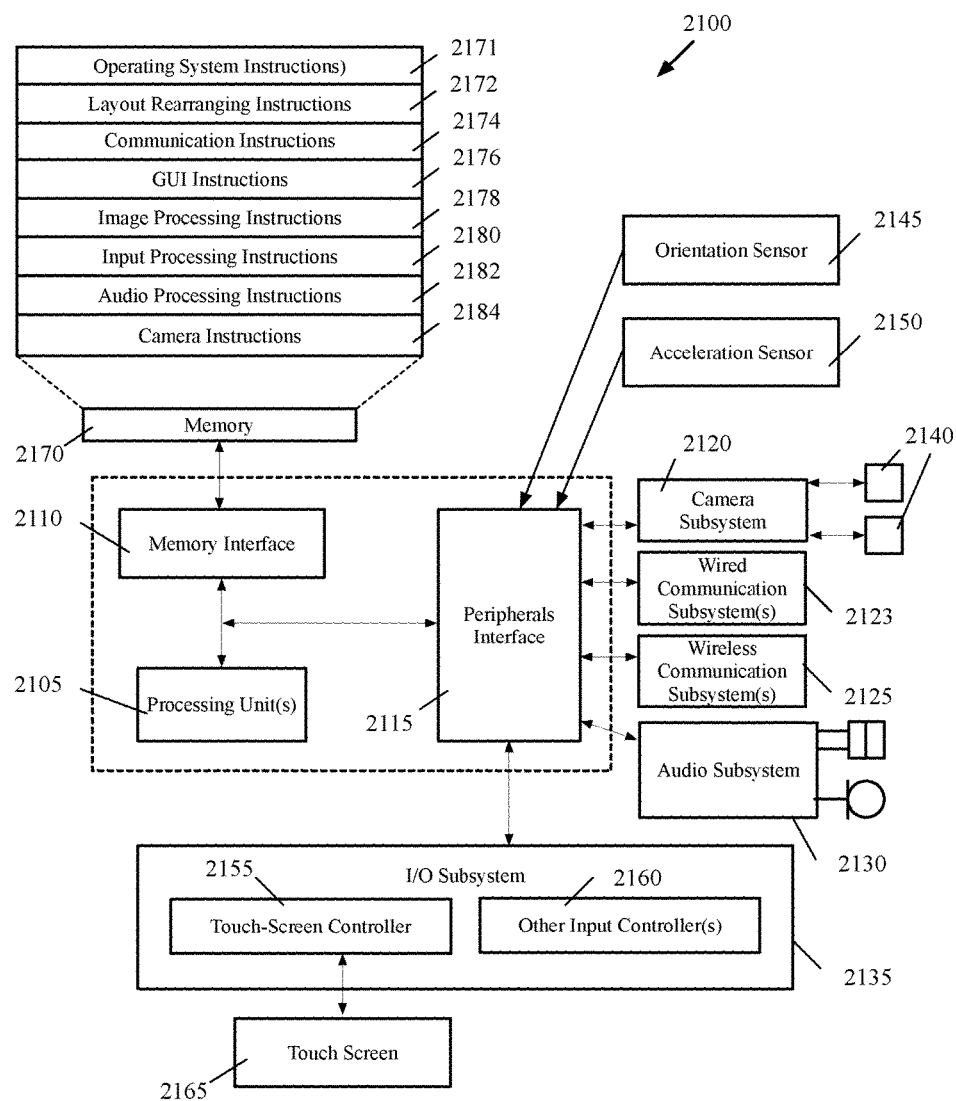
FIG. 21 illustrates an example of an architecture of a mobile computing device of some embodiments.

The applications of some embodiments operate on mobile devices, such as smart phones (e.g., iPhones®) and tablets (e.g., iPads®). FIG. 21 illustrates an example of an architecture 2100 of such a mobile computing device. As shown, the mobile computing device 2100 includes one or more processing units 2105, a memory interface 2110 and a peripherals interface 2115.

The peripherals interface 2115 is coupled to various sensors and subsystems, including a camera sub system 2120, a wired communication subsystem(s) 2123, a wireless communication subsystem(s) 2125, an audio subsystem 2130, an I/O subsystem 2135, etc. The peripherals interface 2115 enables communication between the processing units 2105 and various peripherals. For example, an orientation sensor 2145 (e.g., a gyroscope) and an acceleration sensor 2150 (e.g., an accelerometer) is coupled to the peripherals interface 2115 to facilitate orientation and acceleration functions.

The camera subsystem 2120 is coupled to one or more optical sensors 2140 (e.g., a charged coupled device (CCD) optical sensor, a complementary metal-oxide-semiconductor (CMOS) optical sensor, etc.). The camera subsystem 2120 coupled with the optical sensors 2140 facilitates camera functions, such as image and/or video data capturing. The wired communication subsystem 2123 and wireless communication subsystem 2125 serve to facilitate communication functions.

In some embodiments, the wireless communication subsystem 2125 includes radio frequency receivers and transmitters, and optical receivers and transmitters (not shown in FIG. 21). These receivers and transmitters of some embodiments are implemented to operate over one or more communication networks such as a GSM network, a Wi-Fi network, a Bluetooth network, etc. The audio subsystem 2130 is coupled to a speaker to output audio (e.g., to output voice navigation instructions). Additionally, the audio subsystem 2130 is coupled to a microphone to facilitate voice-enabled functions in some embodiments.

The I/O subsystem 2135 involves the transfer between input/output peripheral devices, such as a display, a touch screen, etc., and the data bus of the processing units 2105 through the peripherals interface 2115. The I/O subsystem 2135 includes a touch-screen controller 2155 and other input controllers 2160 to facilitate the transfer between input/output peripheral devices and the data bus of the processing units 2105. As shown, the touch-screen controller 2155 is coupled to a touch screen 2165. The touch-screen controller 2155 detects contact and movement on the touch screen 2165 using any of multiple touch sensitivity technologies. The other input controllers 2160 are coupled to other input/control devices, such as one or more buttons. Some embodiments include a near-touch sensitive screen and a corresponding controller that can detect near-touch interactions instead of or in addition to touch interactions.

The memory interface 2110 is coupled to memory 2170. In some embodiments, the memory 2170 includes volatile memory (e.g., high-speed random access memory), non-volatile memory (e.g., flash memory), a combination of volatile and non-volatile memory, and/or any other type of memory. As illustrated in FIG. 21, the memory 2170 stores an operating system (OS) 2171. The OS 2171 includes instructions for handling basic system services and for performing hardware dependent tasks. The memory 2170 additionally includes layout rearranging instructions 2172 in order for the device 2100 to perform the layout rearranging process of some embodiments. In some embodiments, these instructions 2172 may be a subset of the operating system instructions 2171, or may be part of the instructions for an application.

The memory 2170 also includes communication instructions 2174 to facilitate communicating with one or more additional devices (e.g., for peer-to-peer data sharing, or to connect to a server through the Internet for cloud-based data sharing); graphical user interface instructions 2176 to facilitate graphic user interface processing; image processing instructions 2178 to facilitate image-related processing and functions; input processing instructions 2180 to facilitate input-related (e.g., touch input) processes and functions; audio processing instructions 2182 to facilitate audio-related processes and functions; and camera instructions 2184 to facilitate camera-related processes and functions. The instructions described above are merely exemplary and the memory 2170 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 21 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 21 may be split into two or more integrated circuits.

Figure 22:
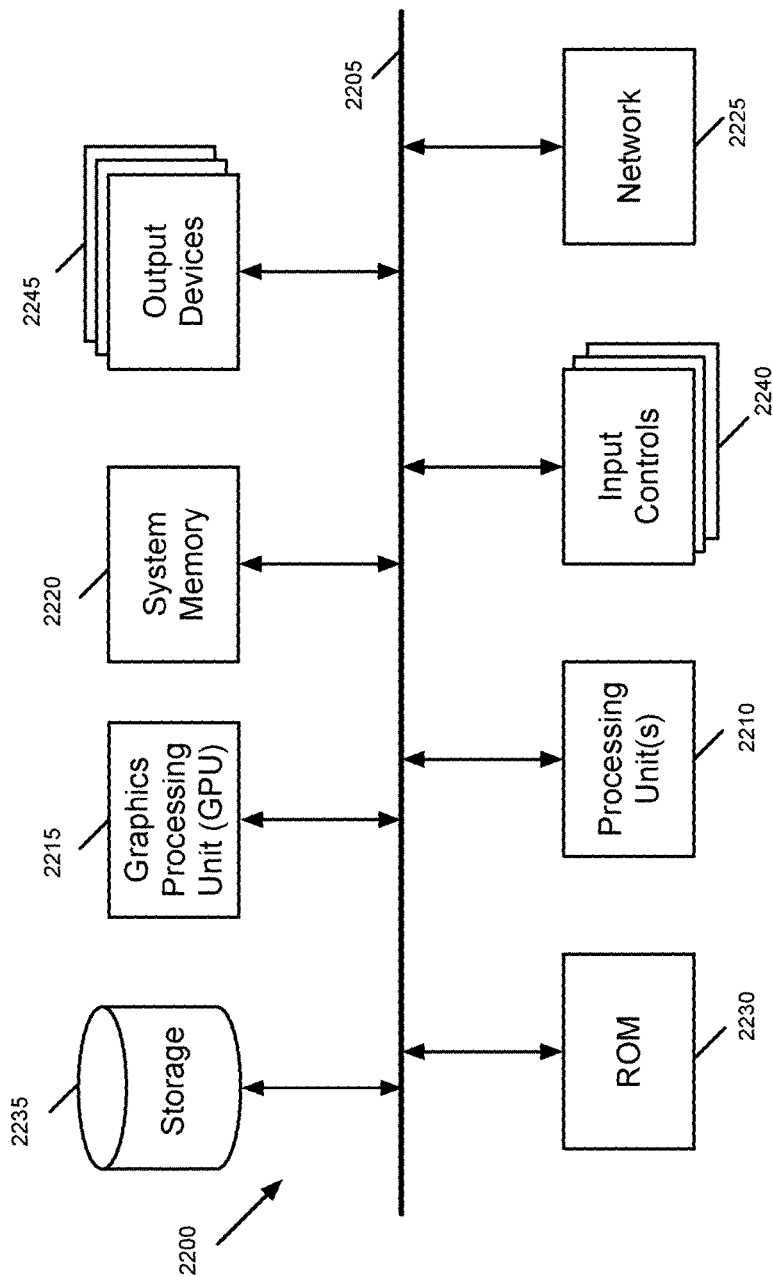
FIG. 22 conceptually illustrates another example of an electronic system with which some embodiments of the invention are implemented.

FIG. 22 conceptually illustrates another example of an electronic system 2200 with which some embodiments of the invention are implemented. The electronic system 2200 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2200 includes a bus 2205, processing unit(s) 2210, a graphics processing unit (GPU) 2215, a system memory 2330, a network 2335, a read-only memory 2230, a permanent storage device 2235, input devices 2240, and output devices 2245.

The bus 2205 collectively represents all system, peripheral, and chipset buses that communicatively connect the numerous internal devices of the electronic system 2200. For instance, the bus 2205 communicatively connects the processing unit(s) 2210 with the read-only memory 2230, the GPU 2215, the system memory 2330, and the permanent storage device 2235.

From these various memory units, the processing unit(s) 2210 retrieves instructions to execute and data to process in order to execute the processes of the invention. The processing unit(s) may be a single processor or a multi-core processor in different embodiments. Some instructions are passed to and executed by the GPU 2215. The GPU 2215 can offload various computations or complement the image processing provided by the processing unit(s) 2210. In some embodiments, such functionality can be provided using CoreImage's kernel shading language.

The read-only-memory (ROM) 2230 stores static data and instructions that are needed by the processing unit(s) 2210 and other modules of the electronic system. The permanent storage device 2235, on the other hand, is a read-and-write memory device. This device is a non-volatile memory unit that stores instructions and data even when the electronic system 2200 is off. Some embodiments of the invention use a mass-storage device (such as a magnetic or optical disk and its corresponding disk drive, integrated flash memory) as the permanent storage device 2235.

Other embodiments use a removable storage device (such as a floppy disk, flash memory device, etc., and its corresponding drive) as the permanent storage device. Like the permanent storage device 2235, the system memory 2330 is a read-and-write memory device. However, unlike storage device 2235, the system memory 2330 is a volatile read-and-write memory, such a random access memory. The system memory 2330 stores some of the instructions and data that the processor needs at runtime. In some embodiments, the invention's processes are stored in the system memory 2330, the permanent storage device 2235, and/or the read-only memory 2230. For example, the various memory units include instructions for processing multimedia clips in accordance with some embodiments. From these various memory units, the processing unit(s) 2210 retrieves instructions to execute and data to process in order to execute the processes of some embodiments.

The bus 2205 also connects to the input and output devices 2240 and 2245. The input devices 2240 enable the user to communicate information and select commands to the electronic system. The input devices 2240 include alpha-numeric keyboards and pointing devices (also called "cursor control devices"), cameras (e.g., webcams), microphones or similar devices for receiving voice commands, etc. The output devices 2245 display images generated by the electronic system or otherwise output data. The output devices 2245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 22, bus 2205 also couples electronic system 2200 to a network 2335 through a network adapter (not shown). In this manner, the computer can be a part of a network of computers (such as a local area network ("LAN"), a wide area network ("WAN"), or an Intranet), or a network of networks, such as the Internet. Any or all components of electronic system 2200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD- R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures (including FIGS. 2 and 10) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

Figure 23:
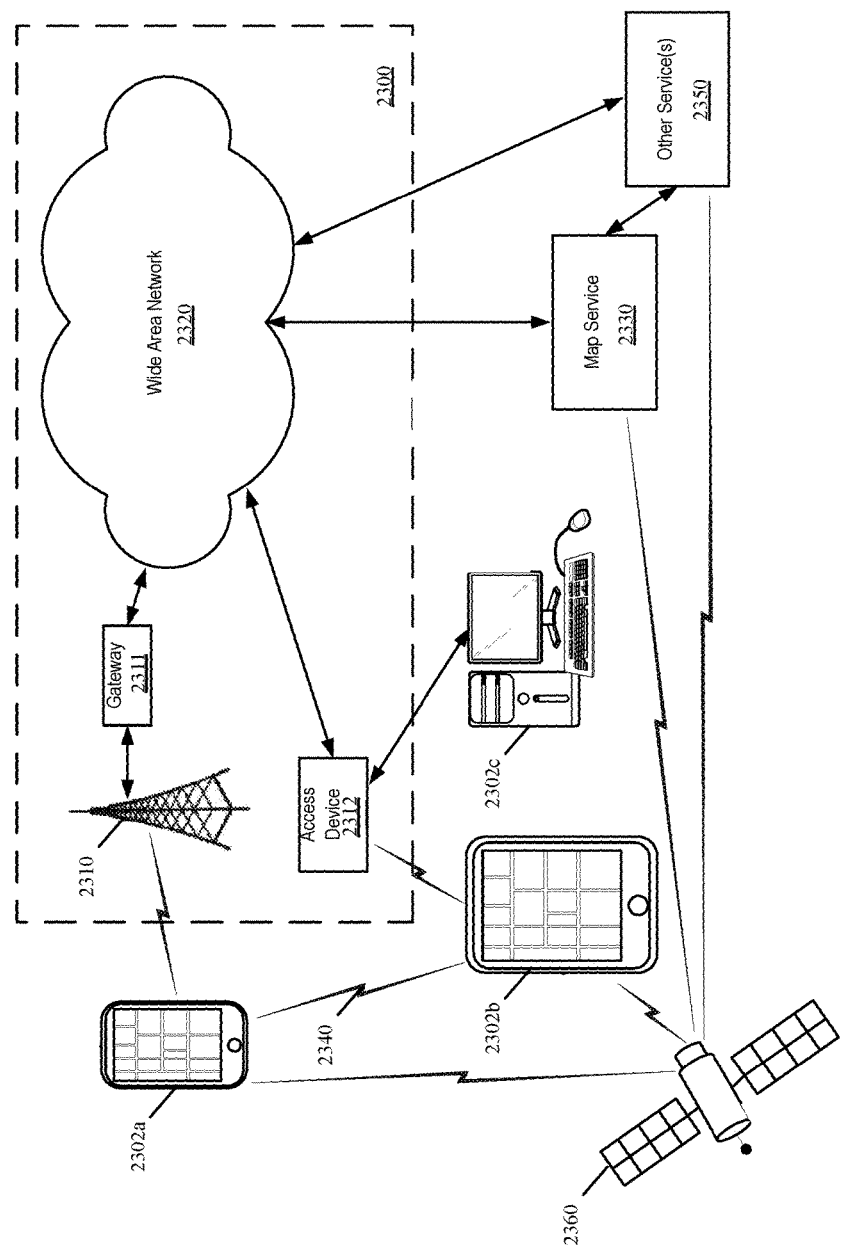
FIG. 23 illustrates one possible embodiment of an operating environment for a map service (also referred to as a mapping service) and client devices.

Various embodiments may operate within a map service operating environment. FIG. 23 illustrates one possible embodiment of an operating environment 2300 for a map service (also referred to as a mapping service) 2330 and client devices 2302a-2302c. In some embodiments, devices 2302a, 2302b, and 2302c communicate over one or more wired or wireless networks 2310. For example, wireless network 2310, such as a cellular network, can communicate with a wide area network (WAN) 2320, such as the Internet, by use of gateway 2314. A gateway 2314 in some embodiments provides a packet oriented mobile data service, such as General Packet Radio Service (GPRS), or other mobile data service allowing wireless networks to transmit data to other networks, such as wide area network 2320. Likewise, access device 2323 (e.g., IEEE 802.11g wireless access device) provides communication access to WAN 2320.

The client devices 2302a and 2302b can be any portable electronic or computing device capable of communicating with a map service (e.g., smart phone, tablet, laptop computer, etc.). Device 2302c can be any non-portable electronic or computing device capable of communicating with a map service (e.g., desktop computer, etc.). These devices may be multifunction devices capable of various functions (e.g., placing phone calls, sending electronic messages, producing documents, etc.). Though the devices 2302a-2302c are not shown as each accessing the map service 2330 via either the wireless network 2310 and gateway 2314 or the access device 2323, one of ordinary skill in the art will recognize that the client devices of some embodiments may access the map service via multiple different wired and/or wireless protocols.

Devices 2302a-2302c can also establish communications by other means. For example, these devices may communicate with other wireless devices (e.g., other devices 2302b, cell phones, etc.) over the wireless network 2310 or through access device 2323. Likewise the devices 2302a-2302c can establish peer-to-peer communications 2340 (e.g., a personal area network) by use of one or more communication subsystems, such as Bluetooth® communication or similar peer-to-peer protocols.

Devices 2302a-2302c may also receive Global Positioning Satellite (GPS) signals from GPS satellites 2360. In addition, in some embodiments the map service 2330 and other services 2350 may also receive GPS signals from GPS satellites 2360.

A map service 2330 may provide map services for one or more client devices 2302a-2302c in communication with the map service 2330 through various communication methods and protocols. A map service 2330 in some embodiments provides map information (e.g., map tiles used by the client devices to generate a two-dimensional or three-dimensional map presentation) and other map-related data, such as two-dimensional map image data (e.g., aerial view of roads utilizing satellite imagery), three-dimensional map image data (e.g., traversable map with three-dimensional features, such as buildings), route and direction calculations (e.g., driving route data, ferry route calculations, directions between two points for a pedestrian, etc.), real-time navigation data (e.g., turn-by-turn visual navigation data in two or three dimensions), traffic data, location data (e.g., where the client device currently is located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. The client devices 2302a-2302c may utilize these map services to obtain the various map service data, then implement various techniques to process the data and provide the processed data to various entities (e.g., internal software or hardware modules, display screens of the client devices, external display screens, or other external systems or devices.

The map service 2330 of some embodiments provides map services by generating and distributing the various types of map service data listed above, including map information used by the client device to generate and display a map presentation. In some embodiments, the map information includes one or more map tiles. The map tiles may include raster image data (e.g., bmp, gif, jpg/jpeg/, png, tiff, etc. data) for display as a map presentation. In some embodiments, the map tiles provide vector-based map data, with the map presentation data encoded using vector graphics (e.g., svg or drw data). The map tiles may also include various other information pertaining to the map, such as metadata. Some embodiments also encode style data (e.g., used to generate textures) into the map tiles. The client device processes (e.g., renders) the vector and/or raster image data to generate a map presentation for display as a two-dimensional or three-dimensional map presentation. To transmit the map tiles to a client device 2302a-2302c, the map service 2330 of some embodiments, performs various optimization techniques to analyze a map tile before encoding the tile.

In some embodiments, the map tiles are generated by the map service 2330 for different possible display resolutions at the client devices 2302a-2302c. In some embodiments, the higher zoom levels may include more detail (e.g., more street level information, etc.). On the other hand, map tiles for lower zoom levels may omit certain data (e.g., the street level details would not be used when displaying the entire earth).

To generate the map information (e.g., map tiles), the map service 2330 may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

In some embodiments, the map service 2330 responds to requests from the client devices 2302a-2302c for map information. The client devices may request specific portions of a map, or specific map tiles (e.g., specific tiles at specific zoom levels). In some embodiments, the client devices may provide the map service with starting locations (or current locations) and destination locations for a route calculations, and request turn-by-turn navigation data. A client device may also request map service rendering information, such as map textures or style sheets. Requests for other geographic data may include, but are not limited to, current location, wireless network coverage, weather, traffic information, or nearby points-of-interest.

The client devices 2302a-2302c that obtain map service data from the map service 2330 and render the data to display the map information in two-dimensional and/or three-dimensional views. Some embodiments display a rendered map and allow a user, system, or device to provide input to manipulate a virtual camera for the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. Other input devices to the client device may be used including, e.g., auditory input (e.g., spoken words), a physical keyboard, mouse, and/or a joystick. Some embodiments provide various visual feedback to virtual camera manipulations, such as displaying an animation of possible virtual camera manipulations when transitioning from two-dimensional map views to three-dimensional map views.

In some embodiments, a client device 2302a-2302c implements a navigation system (e.g., turn-by-turn navigation), which may be part of an integrated mapping and navigation application. A navigation system provides directions or route information, which may be displayed to a user. As mentioned above, a client device may receive both map image data and route data from the map service 2330. In some embodiments, the navigation feature of the client device provides real-time route and direction information based upon location information and route information received from a map service and/or other location system, such as a Global Positioning Satellite (GPS) system. A client device may display map image data that reflects the current location of the client device and update the map image data in real-time. The navigation features may provide auditory or visual directions to follow a certain route, and some embodiments display map data from the perspective of a virtual camera biased toward the route destination during turn-by-turn navigation.

The client devices 2302a-2302c of some embodiments implement various techniques to utilize the received map service data (e.g., optimized rendering techniques). In some embodiments, a client device locally stores some of the information used to render map data. For instance, client devices may store style sheets with rendering directions for image data containing style identifiers, common image textures (in order to decrease the amount of map image data transferred from the map service), etc. The client devices of some embodiments may implement various techniques to render two-dimensional and three-dimensional map image data, including, e.g., generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data.

In various embodiments, map service 2330 and/or other service(s) 2350 are configured to process search requests from any of the client devices. Search requests may include but are not limited to queries for businesses, addresses, residential locations, points of interest, or some combination thereof. Map service 2330 and/or other service(s) 2350 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 2330 and/or other service(s) 2350 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 2330 and/or other service(s) 2350, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 2330 and/or other service(s) 2350 provide one or more feedback mechanisms to receive feedback from client devices 2302*a*-2302*c*. For instance, client devices may provide feedback on search results to map service 2330 and/or other service(s) 2350 (e.g., feedback specifying ratings, reviews, temporary or permanent business closures, errors etc.); this feedback may be used to update information about points of interest in order to provide more accurate or more up-to-date search results in the future. In some embodiments, map service 2330 and/or other service(s) 2350 may provide testing information to the client device (e.g., an A/B test) to determine which search results are best. For instance, at random intervals, the client device may receive and present two search results to a user and allow the user to indicate the best result. The client device may report the test results to map service 2330 and/or other service(s) 2350 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures. However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. One of ordinary skill in the art would understand that the invention is not to be limited by the foregoing illustrative details, but rather is to be defined by the appended claims.

The invention claimed is:

1. A method of providing reports on a device regarding incidents on transit lines, the method comprising:
    receiving a request to display a transit incident reporting display area that is accessible on the mobile device without opening of a map application;
    directing the map application to identify any incident associated with any transit line that has been identified as a transit line of interest by the map application; and
    in the transit incident reporting display area, displaying incident information about a set of incidents associated with the identified transit line without opening of the map application.

2. The method of claim 1 further comprising providing an affordance to view the incident reporting display area without opening of the map application.

3. The method of claim 2, wherein the device is a mobile device, and the affordance is accessible through a display page of the mobile device that is generated by the operating system of the device.

4. The method of claim 3, wherein the display page is the home page of the mobile device.

5. The method of claim 1 further comprising:
    through the map application executing on the device, receiving identification of a plurality of transit lines of interest; and
    in the incident reporting display area, displaying information about a set of incidents for each transit line of interest that has at least one associated incident.

6. The method of claim 5, wherein displaying information for each transit line of interest comprises:
    in the incident reporting display area,
    displaying a condensed list of transit lines with associated incident information;
    upon selection of the condensed list, displaying an expanded list that provides additional information about at least two sets of incidents associated with at least two transit lines of interest.

7. The method of claim 5, wherein displaying the information for each transit line of interest comprises:
    in the incident reporting display area, identifying information about one set of incidents about a first transit line, while specifying that no incidents exist for a second transit line.

8. The method of claim 1 further comprising:
    upon selection of the incident reporting display area, opening the map application to present an incident display pane to provide additional information about the set of incidents associated with the transit line.

9. The method of claim 8, wherein the incident display pane is displayed over a map that contains the transit line.

10. The method of claim 1, wherein the incident reporting display area is a display area created by an operating system of the device and the map application provides to the operating system content for display in the incident reporting display area.

11. The method of claim 10,
    wherein the operating system instructs the map application to provide content for display in the incident reporting display area whenever an operating system affordance is used to request display of the incident reporting display area; and
    wherein in response to the instruction, the map application identifies any transit line of interest, collects incident information about any transit line of interest, generates content for display in the incident reporting display area to identify the set of incidents for each transit line of interest with at least one incident, and provides the content to the operating system for display in the incident reporting display area.

12. The method of claim 1, wherein the transit line of interest is a transit line that has been selected through the map application as being as a transit line of interest by a user.

13. The method of claim 1, wherein the device is a mobile device, and the transit line of interest is a transit line that the map application has previously identified as a transit line that has been used by the mobile device for more than a particular number of times.

14. The method of claim 13, wherein the transit line of interest is a transit line that has been used more than a particular number of times by the map application to provide navigation instructions as the mobile device navigates a route that includes the transit line.

15. A mobile device comprising:
a non-transitory machine readable medium storing a map application for displaying transit lines on a map, and an operating system for providing reports regarding incidents on transit lines;
a set of processing units for executing the operating system and the map application; and the operating system comprising instructions for:
receiving a request to display a page that includes a transit incident reporting display area that is accessible on the mobile device without opening of the map application;
directing the map application to identify any incident associated with any transit line that has been identified as a transit line of interest by the map application; and
in the transit incident reporting display area, displaying incident information provided by the map application for the transit line of interest.

16. The mobile device of claim 15, wherein the program further comprises a set of instructions for providing an affordance to view the incident reporting display area without opening of the map application.

17. The mobile device of claim 16, wherein the device is a mobile device, and the affordance is accessible through a home page of the mobile device that is generated by an operating system of the device.

18. A non-transitory machine readable medium storing a map application for displaying transit lines, and an operating system for providing reports on a mobile device regarding incidents on transit lines, the program comprising sets of instructions for:
receiving input requesting display of a transit incident reporting display area that is accessible on the mobile device without opening of the map application;
directing the map application to identify any incident associated with any transit line that has been identified as a transit line of interest by the map application; and
receiving identification of a transit line of interest through a map application executing on the mobile device; and
displaying information about a set of incidents associated with the transit line of interest in the transit incident reporting display area without opening of the map application.

19. A non-transitory machine readable medium of claim 18, wherein
the set of incidents includes 0 or more incidents,
the incident reporting display area specifying no incidents exist for the transit line when the set of incidents includes 0 incidents; and
the incident reporting display area listing at least one incident for the transit line when the set of incidents includes 1 or more incidents.

20. The non-transitory machine readable medium of claim of claim 18, wherein the program further comprises a set of instructions for providing an affordance to view the incident reporting display area without opening of the map application.

* * * * *